(12) United States Patent
Zhu et al.

(10) Patent No.: US 8,953,578 B2
(45) Date of Patent: Feb. 10, 2015

(54) METHOD AND SYSTEM FOR CONTENTION AVOIDANCE IN MULTI-USER MULTIPLE-INPUT-MULTIPLE-OUTPUT WIRELESS NETWORKS

(75) Inventors: Chunhui Zhu, San Jose, CA (US); Clint Chaplin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 12/821,940

(22) Filed: Jun. 23, 2010

(65) Prior Publication Data

US 2011/0317630 A1    Dec. 29, 2011

(51) Int. Cl.
*H04J 3/24* (2006.01)
*H04W 74/08* (2009.01)

(52) U.S. Cl.
CPC .............................. *H04W 74/0816* (2013.01)
USPC .......................................... 370/349; 370/445

(58) Field of Classification Search
CPC ....... H04W 80/04; H04W 4/06; H04W 74/08; H04W 74/0816; H04W 74/0825; H04L 12/413
USPC ......... 370/348, 349, 445, 443, 312, 314, 321, 370/322, 337, 432, 447, 461
See application file for complete search history.

(56) References Cited

U.S. PATENT DOCUMENTS

| | | | |
|---|---|---|---|
| 5,615,212 A | 3/1997 | Ruszczyk et al. | |
| 5,886,993 A | 3/1999 | Ruszczyk et al. | |
| 6,198,728 B1 | 3/2001 | Hulyalkar et al. | |
| 6,795,421 B1 | 9/2004 | Heinonen et al. | |
| 6,807,158 B2 | 10/2004 | Krishnamurthy et al. | |
| 6,813,277 B2 | 11/2004 | Edmon et al. | |
| 6,868,072 B1 | 3/2005 | Lin et al. | |
| 6,925,064 B2 | 8/2005 | Hester et al. | |
| 7,079,812 B2 | 7/2006 | Miller et al. | |
| 7,088,702 B2 | 8/2006 | Shvodian | |
| 7,127,254 B2 | 10/2006 | Shvodian et al. | |
| 7,184,767 B2 | 2/2007 | Gandolfo | |
| 7,197,025 B2 | 3/2007 | Chuah | |
| 7,251,235 B2 | 7/2007 | Wentink | |
| 7,280,518 B2 | 10/2007 | Montano et al. | |
| 7,280,801 B2 | 10/2007 | Dahl | |
| 7,339,916 B2 | 3/2008 | Kwon et al. | |
| 7,356,341 B2 | 4/2008 | Nanda | |

(Continued)

OTHER PUBLICATIONS

U.S. Non-Final Office Action mailed Oct. 26, 2011 for U.S. Appl. No. 12/455,438.

(Continued)

*Primary Examiner* — Brenda H Pham
(74) *Attorney, Agent, or Firm* — Sherman IP LLP; Kenneth L. Sherman; Steven Laut

(57) ABSTRACT

Wireless medium reservation for simultaneous transmission of multiple downlink spatial streams to multiple receiver wireless stations during a multi-user transmit opportunity over a wireless medium, is provided. Such a reservation includes reserving a transmission period for simultaneously transmitting data from a transmitting station to multiple intended receiving stations on multiple downlink spatial streams over a wireless communication medium. Reserving the transmission period includes transmitting a request-to-send (RTS) frame to the multiple receiving stations, the RTS frame including a receiver address (RA) field comprising compressed addresses for the multiple receiving stations.

43 Claims, 15 Drawing Sheets

(56) References Cited

U.S. PATENT DOCUMENTS

| | | | |
|---|---|---|---|
| 7,359,398 B2 | 4/2008 | Sugaya | |
| 7,385,943 B2 | 6/2008 | Niddam | |
| 7,388,833 B2 | 6/2008 | Yuan et al. | |
| 7,400,899 B2 | 7/2008 | Shin et al. | |
| 7,447,174 B2 | 11/2008 | Joshi | |
| 7,447,180 B2 | 11/2008 | Jeong et al. | |
| 7,474,686 B2 | 1/2009 | Ho | |
| 7,480,266 B2 | 1/2009 | Murty et al. | |
| 7,486,650 B2 | 2/2009 | Trainin | |
| 7,539,930 B2 | 5/2009 | Ginzburg et al. | |
| 7,545,771 B2 | 6/2009 | Wentink et al. | |
| 7,561,510 B2 | 7/2009 | Imamura et al. | |
| 7,570,656 B2 | 8/2009 | Raphaeli et al. | |
| 7,590,078 B2 | 9/2009 | Nanda | |
| 7,623,542 B2 | 11/2009 | Yonge et al. | |
| 7,634,275 B2 | 12/2009 | Odman | |
| 7,664,030 B2 | 2/2010 | Sugaya | |
| 7,664,132 B2 | 2/2010 | Benveniste | |
| 7,680,150 B2 | 3/2010 | Liu et al. | |
| 7,684,380 B2 | 3/2010 | Odman | |
| 7,697,448 B2 | 4/2010 | Karaoguz | |
| 7,881,340 B2 | 2/2011 | Farrag et al. | |
| 7,974,261 B2 | 7/2011 | Lane et al. | |
| 8,089,946 B2 | 1/2012 | Brommer | |
| 8,179,867 B2* | 5/2012 | Seok | 370/336 |
| 8,194,626 B2* | 6/2012 | Moorti et al. | 370/338 |
| 8,437,317 B2 | 5/2013 | Jang et al. | |
| 8,532,221 B2 | 9/2013 | Liu et al. | |
| 2003/0003905 A1 | 1/2003 | Shvodian | |
| 2003/0137970 A1 | 7/2003 | Odman | |
| 2003/0137993 A1 | 7/2003 | Odman | |
| 2003/0214967 A1 | 11/2003 | Heberling | |
| 2004/0047319 A1 | 3/2004 | Elg | |
| 2004/0214571 A1 | 10/2004 | Hong | |
| 2004/0218683 A1 | 11/2004 | Batra et al. | |
| 2004/0264475 A1 | 12/2004 | Kowalski | |
| 2005/0058151 A1 | 3/2005 | Yeh | |
| 2005/0130634 A1 | 6/2005 | Godfrey | |
| 2005/0135318 A1 | 6/2005 | Walton et al. | |
| 2005/0232275 A1 | 10/2005 | Stephens | |
| 2005/0238016 A1 | 10/2005 | Nishibayashi et al. | |
| 2006/0002428 A1 | 1/2006 | Trainin | |
| 2006/0050742 A1 | 3/2006 | Grandhi et al. | |
| 2006/0166683 A1 | 7/2006 | Sharma et al. | |
| 2006/0176908 A1 | 8/2006 | Kwon et al. | |
| 2006/0193279 A1 | 8/2006 | Gu et al. | |
| 2006/0268800 A1 | 11/2006 | Sugaya et al. | |
| 2006/0285516 A1 | 12/2006 | Li et al. | |
| 2007/0060168 A1* | 3/2007 | Benveniste | 455/450 |
| 2007/0116035 A1 | 5/2007 | Shao et al. | |
| 2007/0280180 A1 | 12/2007 | Dalmases et al. | |
| 2008/0159208 A1 | 7/2008 | Kloker et al. | |
| 2008/0212604 A1 | 9/2008 | Liu | |
| 2008/0279204 A1 | 11/2008 | Pratt, Jr. et al. | |
| 2008/0291873 A1 | 11/2008 | Benveniste | |
| 2009/0052389 A1 | 2/2009 | Qin et al. | |
| 2009/0086706 A1 | 4/2009 | Huang et al. | |
| 2009/0092086 A1 | 4/2009 | Lee et al. | |
| 2009/0275292 A1 | 11/2009 | Chang | |
| 2009/0285163 A1 | 11/2009 | Zhang et al. | |
| 2009/0323611 A1 | 12/2009 | Singh et al. | |
| 2010/0002639 A1 | 1/2010 | Qin et al. | |
| 2010/0046453 A1* | 2/2010 | Jones et al. | 370/329 |
| 2010/0046518 A1 | 2/2010 | Takagi et al. | |
| 2010/0061357 A1* | 3/2010 | Takano | 370/338 |
| 2010/0220601 A1* | 9/2010 | Vermani et al. | 370/248 |
| 2010/0310003 A1* | 12/2010 | Lauer et al. | 375/267 |
| 2011/0002319 A1* | 1/2011 | Husen et al. | 370/338 |
| 2011/0064013 A1* | 3/2011 | Liu et al. | 370/312 |
| 2011/0090855 A1 | 4/2011 | Kim | |
| 2011/0176627 A1 | 7/2011 | Wu et al. | |
| 2011/0235513 A1 | 9/2011 | Ali | |
| 2011/0255618 A1 | 10/2011 | Zhu et al. | |
| 2012/0008490 A1 | 1/2012 | Zhu | |
| 2012/0082200 A1 | 4/2012 | Verikoukis et al. | |
| 2012/0087358 A1 | 4/2012 | Zhu et al. | |
| 2012/0140615 A1 | 6/2012 | Gong | |
| 2012/0218947 A1 | 8/2012 | Merlin et al. | |
| 2012/0314694 A1 | 12/2012 | Hsieh | |
| 2014/0010144 A1 | 1/2014 | Liu et al. | |

OTHER PUBLICATIONS

IEEE 802.11e/D13.0, "IEEE Standard for Information Technology—Telecommunications and Information Exchange Between Systems—Local and Metropolitan Area Networks—Specific Requirements: Part 11: Wireless LAN Medium Access Control (MAC) and Physical Layer (PHY) Specifications: Amendment: Medium Access Control (MAC) Quality of Service (QoS) Enhancements," LAN/MAN Committee, IEEE Computer Society, Jan. 2005, IEEE, New York, NY, pp. i-182, United States.

IEEE Wireless LAN Edition, "A Compilation Based on IEEE Std. 802.11TM-1999 (R2003) and Its Amendments," IEEE Press, 2003, United States pp. i-678.

Mujtaba, S.A., "TGn Sync Proposal Technical Specification," IEEE 802.11-04-0889r7, IEEE P802.11: Wireless LANs, Jul. 8, 2005, United States pp. 1-133.

"Kim, S. et al., ""QoS Enhancement Scheme of EDCF in IEEE 802.11e Wireless LANs,"" Electronics Letters, vol. 40, No. 17, Aug. 19, 2004, pp. 1091-1092, United States".

"IEEE 802.11-2007, ""IEEE Standard for Information Technology—Telecommunications and Information Exchange Between Systems—Local and Metropolitan Area Networks—Specific requirements: Part 11: Wireless LAN Medium Access Control (MAC) and Physical Layer (PHY) Specifications,"" 2007 Revision of IEEE Std 802.11-1999, IEEE Computer Society, Jun. 12, 2007, pp. i-1184, United States".

"IEEE 802.16e™—2005, ""IEEE Standard for Local and Metropolitan Area Networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1,"" LAN/MAN Standards Committee, IEEE Computer Society and the IEEE Microwave Theory and Techniques Society, Feb. 28, 2006, pp. i-822, United States".

International Search Report dated Jan. 9, 2009 for International Application No. PCT/KR2008/004793 from Korean Intellectual Property Office, filed Aug. 19, 2008, pp. 1-2.

Harada, H., "Unified and Flexible Millimeter Wave WPAN Systems Supported by Common Mode," IEEE P802.15 Working Group for Wireless Personal Area Networks (WPANs), IEEE 802.15-07-0761-10-003c, Sep. 18, 2007, Slides 1-62, United States.

U.S. Non-final Office Action mailed Jun. 9, 2009 for U.S. Appl. No. 11/589,519.

U.S. Final Office Action mailed May 12, 2010 for U.S. Appl. No. 11/589,519.

U.S. Non-Final Office Action mailed Jun. 27, 2006 for U.S. Appl. No. 11/044,600.

U.S. Non-Final Office Action mailed Aug. 21, 2007 for U.S. Appl. No. 11/044,600.

U.S. Final Office Action mailed Jan. 15, 2008 for U.S. Appl. No. 11/044,600.

U.S. Non-Final Office Action mailed Aug. 7, 2008 for U.S. Appl. No. 11/044,600.

U.S. Non-Final Office Action mailed Jan. 25, 2007 for U.S. Appl. No. 11/044,600.

U.S. Advisory Action mailed May 15, 2008 for U.S. Appl. No. 11/044,600.

Mirkovic, J. et al., "A MAC Protocol With Multi-User MIMO Support for Ad-Hoc WLANs", The 18th Annual IEEE International Symposium on Personal, Indoor and Mobile Radio Communications (PIMRC'07), IEEE, 2007, pp. 1-5, United States.

Stacey, R. et al., "DL MU-MIMO Ack Protocol (IEEE 802.11-09/1172r0)", IEEE, Nov. 16, 2009, pp. 1-8, United States.

IEEE Computer Society, "IEEE Std 802®—2001 (R2007), IEEE Standard for Local and Metropolitan Area Networks: Overview and Architecture", IEEE, Feb. 7, 2002, pp. i-36, New York, United States.

(56) References Cited

OTHER PUBLICATIONS

Camp, J.D. et al., "The IEEE 802.11s Extended Service Set Mesh Networking Standard", IEEE Communications Magazine, vol. 46, No. 8, IEEE, Aug. 2008, pp. 1-6, United States.

U.S. Final Office Action mailed Apr. 12, 2012 for U.S. Appl. No. 12/455,438.

U.S. Non-Final Office Action mailed Jun. 6, 2012 for U.S. Appl. No. 12/415,981.

Morioka, Y. et al., "Multi-RTS Proposal", IEEE 802.11-10/1124r01, Sep. 12, 2010, Slides 1-14, IEEE, USA.

U.S. Final Office Action mailed Dec. 19, 2012 for U.S. Appl. No. 12/415,981.

U.S. Advisory Action mailed Mar. 8, 2013 for U.S. Appl. No. 12/415,981.

U.S. Non-Final Office Action mailed Jul. 11, 2013 for U.S. Appl. No. 12/455,438.

U.S. Non-Final Office Action mailed Aug. 8, 2013 for U.S. Appl. No. 12/415,981.

U.S. Final Office Action mailed Jan. 14, 2014 for U.S. Appl. No. 12/415,981.

U.S. Non-Final Office Action for U.S. Appl. No. 13/177,386 mailed Dec. 17, 2013.

U.S. Non-Final Office Action for U.S. Appl. No. 13/253,926 mailed Nov. 25, 2013.

U.S. Notice of Allowance mailed Oct. 21, 2013 for U.S. Appl. No. 12/455,438.

U.S. Restriction Requirement for U.S. Appl. No. 13/030,070 mailed Nov. 5, 2013.

U.S. Restriction Requirement for U.S. Appl. No. 13/253,926 mailed Oct. 10, 2013.

U.S. Notice of Allowance mailed Apr. 10, 2014 for U.S. Appl. No. 12/415,981.

U.S. Non-Final Office Action for U.S. Appl. No. 13/030,070 mailed May 15, 2014.

U.S. Final Office Action for U.S. Appl. No. 13/253,926 mailed Apr. 29, 2014.

U.S. Supplemental Notice of Allowability for U.S. Appl. No. 13/253,926 mailed Oct. 15, 2014.

U.S. Notice of Allowance for U.S. Appl. No. 13/253,926 mailed Aug. 15, 2014.

\* cited by examiner

| MSB | | | | | | | LSB |
|---|---|---|---|---|---|---|---|
| b7 | b6 | b5 | b4 | b3 | b2 | b1 | b0 |
| Always = 1 | Always = 1 | 0 | 0 | 0 | | | |

METHOD AND SYSTEM FOR CONTENTION AVOIDANCE IN MULTI-USER MULTIPLE-INPUT-MULTIPLE-OUTPUT WIRELESS NETWORKS

FIELD OF THE INVENTION

The present invention relates generally to the field of wireless networks, and in particular, to wireless networks where multiple antennas are used to transmit multiple downlink traffic streams to multiple receiver stations simultaneously.

BACKGROUND OF THE INVENTION

In a typical wireless network utilizing a coordination function for coordinating transmissions among wireless stations, such a function may be implemented in one of the wireless stations or a coordinator device such as an access point (AP). The wireless stations may communicate via directional transmissions using sector antennas and beam-forming antenna arrays. The coordinator device may use omnidirectional transmissions for broadcasts to all wireless stations in all directions (e.g., 360 degrees range). Alternatively, the coordinator may use quasi-omnidirectional transmissions for broadcasts to a wide range, but not necessarily in all directions. In many wireless local area networks (WLANs) such as those according to IEEE 802.11 standards, a coordinator station in infrastructure mode is used for providing contention-free access to a wireless communication medium to support Quality of Service (QoS) for certain applications.

In the absence of a coordinator, to provide contention-free channel time reservation, existing techniques use announcement or information exchange among wireless stations in a network to negotiate/reserve the use of the communication medium.

BRIEF SUMMARY OF THE INVENTION

The present invention provides a method and system for wireless medium reservation for simultaneous transmission of multiple downlink spatial streams to multiple receiver wireless stations during a multi-user transmit opportunity over a wireless medium. Such a reservation includes reserving a transmission period for simultaneously transmitting data from a transmitting station to multiple intended receiving stations on multiple downlink spatial streams over a wireless communication medium. Reserving the transmission period includes transmitting a request-to-send (RTS) frame to the multiple receiving stations, the RTS frame including a receiver address (RA) field comprising compressed addresses for the multiple receiving stations.

These and other features, aspects and advantages of the present invention will become understood with reference to the following description, appended claims and accompanying figures.

BRIEF DESCRIPTION OF THE DRAWINGS

FIG. 5 shows an example field structure of an Association ID (AID) in a compressed RA field, according to an embodiment of the invention.

DETAILED DESCRIPTION OF THE INVENTION

The present invention provides a method and system for communication medium contention avoidance in multi-user (MU) multiple-input-multiple-output (MIMO) wireless networks. In one example, the communication medium comprises a wireless channel such as a radio frequency (RF) channel. In one embodiment, the present invention provides a contention avoidance mechanism comprising a multi-user request-to-send/clear-to-send (RTS/CTS) channel reservation protocol that enhances existing RTS/CTS techniques of wireless local area network (WLAN) standards.

One implementation of the invention is useful for simultaneously transmitting multiple downlink (DL) spatial streams to multiple receiver wireless stations during a multi-user transmit opportunity over a wireless channel. The invention avoids frame collisions due to third party stations, and allows multiple simultaneously transmitted downlink traffic streams. The third party stations comprise hidden terminals that pose frame collision issues.

Figure 1:
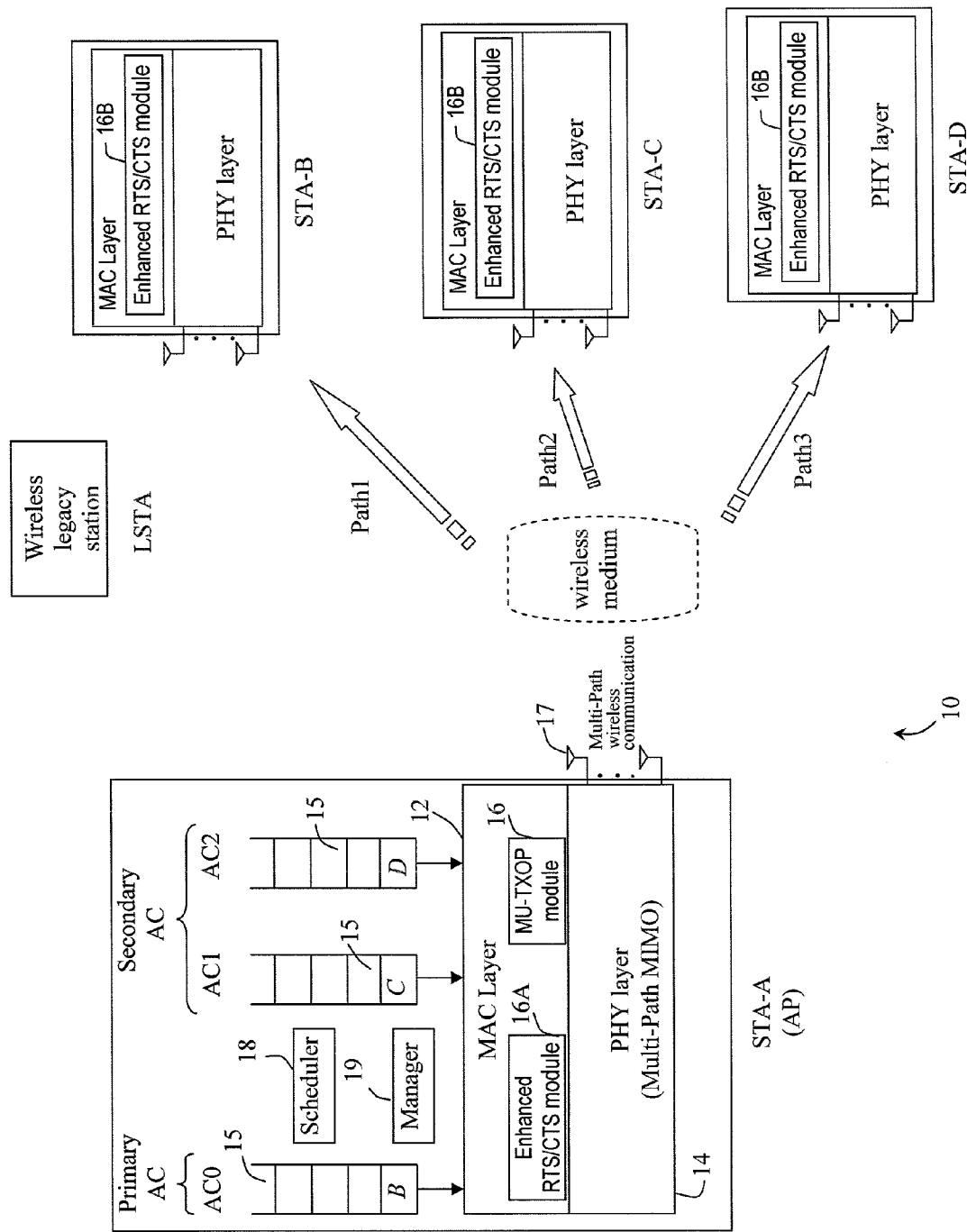
FIG. 1 shows a block diagram of a wireless system implementing an enhanced request-to-send (RTS)/clear-to-send (CTS) mechanism for communication channel reservation, and a multi-user transmit opportunity (MU-TXOP) for channel access, in multi-user multiple-input-multiple-output (MU-MIMO) communication, according to an embodiment of the present invention.

FIG. 1 shows a wireless network 10, according to an embodiment of the invention. The wireless network comprises a wireless local area network (WLAN) comprising multiple wireless stations STA-A, STA-B, STA-C and STA-D capable of communication over a wireless communication channel.

A frame structure is used for data transmission between wireless stations such as a transmitter station and a receiver station. In one example, a frame structure in a Media Access Control (MAC) layer and a physical (PHY) layer is utilized, wherein in a transmitter station, a MAC layer receives a MAC Service Data Unit (MSDU) and attaches a MAC header thereto, in order to construct a MAC Protocol Data Unit (MPDU). The MAC header includes information such as a source address (SA) and a destination address (DA). A number of MPDUs can also be aggregated into an Aggregated MPDU (A-MPDU) to increase MAC layer throughput. The MPDU or A-MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. The PHY layer includes transmission hardware for transmitting data bits over a wireless link. Before transmission as a frame from the transmitter station to the receiver station, a preamble is attached to the PPDU, wherein the preamble can include channel estimation and synchronization information.

In one embodiment according to the invention, communication medium contention avoidance according to the invention is utilized when a transmission opportunity (TXOP) is obtained. The TXOP may be obtained based on IEEE 802.11 channel access standards or using multi-user transmit opportunity (MU-TXOP) mechanism, for a wireless network to support multiple downlink traffic streams to multiple receiver wireless stations simultaneously.

Enhanced Distributed Channel Access (EDCA) provides quality of service (QoS) support for certain applications using announcement or information exchange. EDCA defines four Access Categories (ACs) and introduces service differentiation such that certain data traffic uses higher priority parameters to contend for the communication medium. EDCA allows contention for transmission opportunities (TXOPs), wherein a TXOP is a time interval when a QoS wireless station (STA) may initiate frame transfer on the wireless medium (e.g., wireless channel). The TXOP may be assigned to the wireless station by a coordinator, or the wireless station may obtain the TXOP by successfully contending for the wireless channel.

The wireless station STA-A comprises an access point (AP) having a PHY layer 14 and a MAC layer 12 implementing an EDCA MU-TXOP module 16 according to the invention. In this example, there are three traffic streams (or queues) of data frames (packets) for different Enhanced Distributed Channel Access (EDCA) access categories AC0, AC1, AC2 at the AP station for transmission to receiver stations STA-B, STA-C and STA-D, respectively.

The MAC layer 12 further includes a channel access module 16A comprising an enhanced RTS/CTS module providing enhanced RTS/CTS channel access mechanisms, described further below, according to embodiments of the invention. Each receiver station includes a MAC layer 12 and a PHY layer 14, wherein the MAC layer 12 further implements an enhanced RTS/CTS module 16B providing enhanced RTS/CTS channel access mechanisms in conjunction with the enhanced RTS/CTS module 16A of the AP station, described further below, according to embodiments of the invention.

Figure 2A:
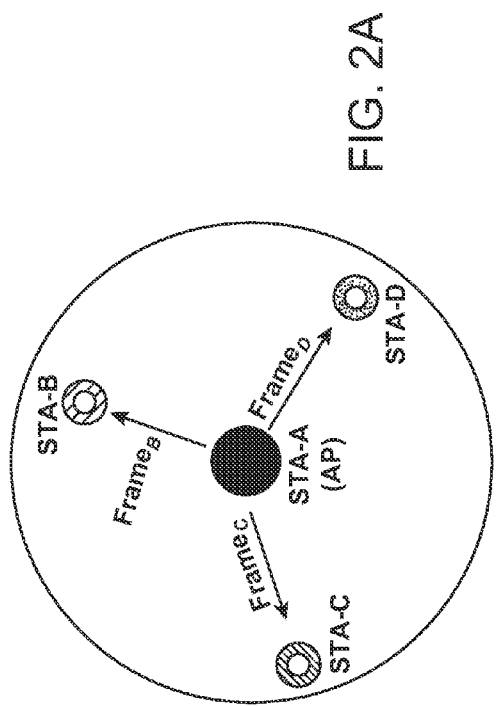
FIG. 2A shows a block diagram of a wireless system implementing downlink (DL) MU-MIMO for simultaneous multi-user communication, according to an embodiment of the present invention.
Figure 2B:
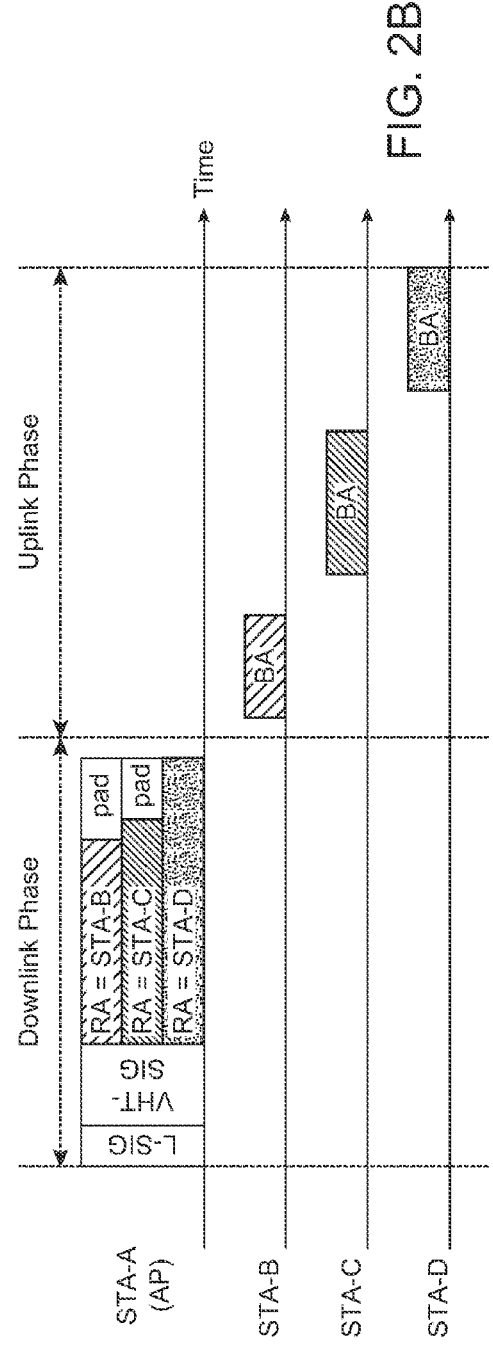
FIG. 2B shows a timing diagram of wireless channel access and transmission sequence in a MU-MIMO communication, according to an embodiment of the present invention.

FIG. 2A illustrates a downlink transmission involving multi-user MIMO transmission of frames B, C, D from the AP station to the receiver stations STA-B, STA-C, STA-D during a MU-TXOP, respectively, via multi-path directional transmissions, according to an embodiment of the invention. FIG. 2B shows a timing diagram for the example communication in FIG. 2A, wherein during a MU-TXOP in a downlink phase, the AP station simultaneously directionally transmits three frames B, C, D (each with a specified receiver address (RA)) to the receiver stations STA-B, STA-C and STA-D, respectively. In an uplink phase, each of the receiver stations sends a block acknowledgement (BA) to the AP station.

Embodiments of the invention provide a modified RTS/CTS mechanism that avoids frame collisions due to third party stations, and allows multiple simultaneously transmitted downlink traffic streams, as described below.

For downlink MU-MIMO, a wireless channel is reserved between a wireless sender and multiple wireless receivers. As one of the typical methods, Network Allocation Vector (NAV) information can be delivered to multiple receivers using a CTS-to-self packet. The CTS-to-self mechanism eliminates exchange of RTS/CTS messages and relies on a wireless station to determine channel availability before transmission. However, the CTS-to-self mechanism cannot handle hidden nodes (hidden terminals) and collisions, as RTS/CTS mechanism does. A hidden node problem exists when a wireless node is visible from a wireless station such as an access point (AP), but is not visible from other wireless nodes communicating with the wireless station, causing media access control issues.

Embodiments of the present invention provide an enhancement of existing RTS/CTS mechanisms for channel reservation in a downlink MU-MIMO environment with backward compatibility. The enhanced RTS/CTS mechanism according to the invention allows channel reservation among a wireless sender and multiple wireless receivers, while coping with the hidden node problem.

Figure 3:
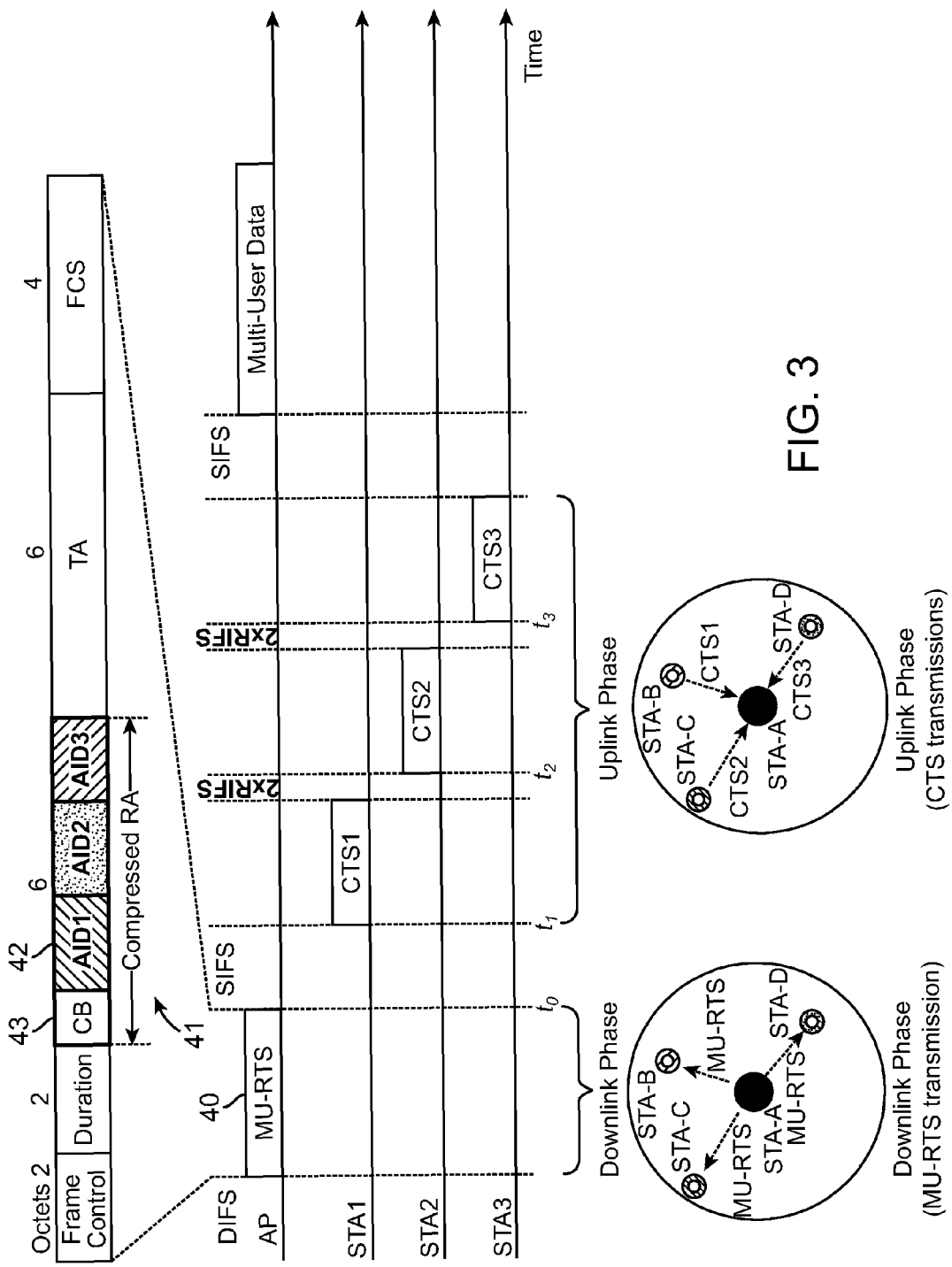
FIG. 3 shows a frame structure of an enhanced RTS and a timing diagram of a wireless channel reservation sequence using a multi-user RTS (MU-RTS) frame providing enhanced RTS/CTS channel reservation in a DL MU-MIMO wireless network environment, according to an embodiment of the invention.

Referring to FIG. 3, an implementation of an enhanced RTS/CTS mechanism according to the invention is illustrated. Specifically, FIG. 3 shows a timing diagram of a wireless channel reservation sequence for downlink MU-MIMO communication using the enhanced RTS/CTS mechanism in a downlink MU-MIMO wireless network environment such as network 10 in FIG. 1. The example wireless channel reservation sequence in FIG. 3 is performed in advance of transmission of multi-user data. When a STA is able to send RTS, it has already obtained access to the wireless channel.

As illustrated in FIG. 3, the disclosed enhanced RTS/CTS mechanism provides a compressed receiver address (RA) field 41 for a RTS frame 40 to be transmitted from a wireless sender such as a wireless AP station, to multiple wireless receivers such as wireless stations STA1, STA2, STA3 over a wireless channel. The RTS frame 40 comprises a multi-user RTS (MU-RTS) frame for transmission to multiple receiver STAs in a MU-MIMO wireless network environment. The enhanced RTS/CTS mechanism further provides a shortened inter-frame space between multiple transmission of CTS frames from receiver STAs (e.g., 2×RIFS where RIFS stands for Reduced Inter-Frame Spacing in IEEE 802.11 standards), as described further below.

According to an embodiment of the invention, the compressed RA field 41 is achieved using an Association ID (AID) 42 instead of a typical full IEEE-48 MAC address. The Association ID is a value assigned by the AP station to each wireless station that associates with the AP station. The compressed RA field includes multiple AID fields 42. The compressed RA field 41 further comprises Compatibility Bits (CB) 43.

Figure 4:
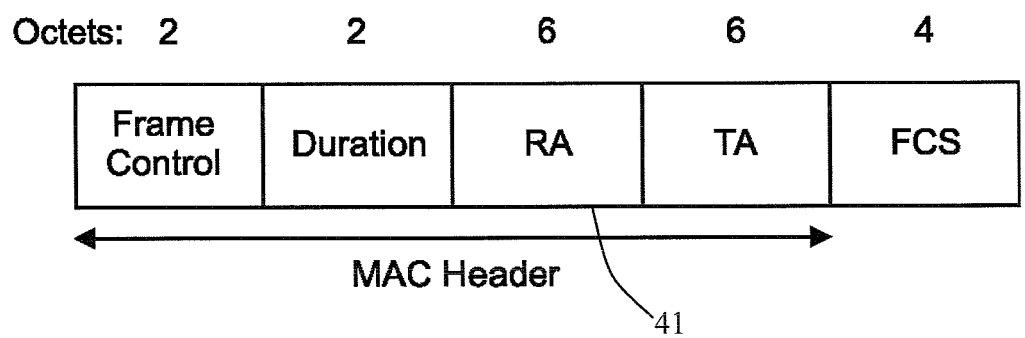
FIG. 4 shows an enhanced RTS frame including a compressed receiver address (RA) field, representing multiple wireless receiver stations, for enhanced RTS/CTS channel reservation in MU-MIMO communication, according to an embodiment of the invention.

FIG. 4 shows the RTS frame 40 with the compressed RA field 41 which represents multiple wireless receiver stations (receiver STAs). In one implementation, the compressed RA field 41 may carry up to three AIDs 42 for three receiver STAs (e.g., AID1, AID2, AID3 corresponding to STAT, STA2, STA3 in FIG. 3).

Using AIDs in a Compressed RA Field

FIG. 5 shows the field structure of a typical AID 42 in the IEEE 802.11 standard. In FIG. 5, MSB represents most significant bits and LSB represents least significant bits, among bits b0-b7. Each AID 42 is a value assigned to a corresponding receiver STA by the AP station in an association response frame that establishes current association of that receiver STA. Each AID 42 is a field that is carried by several MAC layer frames and it has the following features. Each AID field is of 2-octet long and it always has its two MSBs b7 and b6 of the second octet set to 1. An AID is always unique in a Basic Service Set (BSS) so it can be used to uniquely identify a STA. Valid AID values range from 1 to 2007 (i.e., using only 11 bits even though the total length of the field is two octets). Up to 2007 receiver STAs can be uniquely addressed in a BSS. The AID values 0, and 2008 through 16383, are reserved. In the compressed RA field 41, each AID 42 is only 14 bits long, excluding the two MSBs of the second octet. Although the AID field is typically 2 octets long, only 14 bits are used in the compressed RA field according to an embodiment of the invention in order to conserve space.

Figure 6:
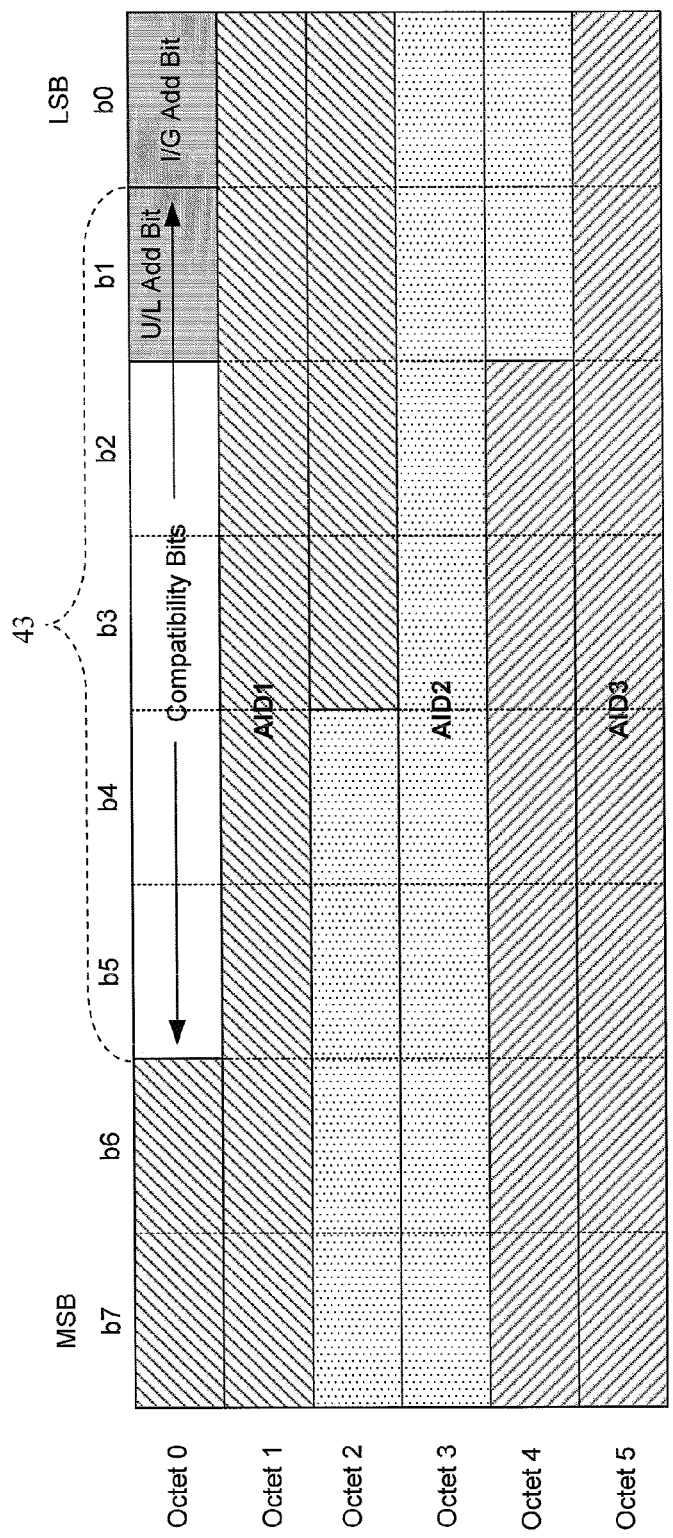
FIG. 6 shows an example field structure of a compressed RA field including multiple AID fields, according to an embodiment of the invention.

FIG. 6 shows a compressed RA field 41 containing 3 AID fields (AID1, AID2, AID3 represented by different stippling, each is of 14 bits in length), according to an embodiment of the invention. Bit b0 of Octet 0 of the compressed RA field 41 indicates whether the compressed RA field 41 includes an individual station address or a group address, according to existing IEEE standard. According to an embodiment of the invention, it is set to indicate an individual address even though it in fact carries multiple individual addresses. Bits b1-b5 of Octet 1 of the compressed RA field 41 comprise Compatibility Bits (CB) 43, used to ensure the temporarily constructed addresses (i.e., compressed addresses) using AIDs does not equal to any actual (i.e., not virtual, real, normal or conventional) MAC addresses in the network.

The compressed RA field 41 holds at most 3 AIDs for three receiver STAs according to one embodiment of the invention. Each AID is 14 bits, instead of the original 16 bits. The two MSBs of the original AID are removed since they are always set to is in the existing standard. An AID field is set to 0 if it is not used to indicate any receiver STA. The order the AIDs are presented in the compressed RA field 41 indicates order of transmission of CTS frames (e.g., CTS1, CTS2, CTS3 in FIG. 3) from the corresponding receiver STAs (STA1, STA2, STA3) back to the AP station over the wireless channel.

The compressed addresses based on AIDs represent temporary or virtual addresses for corresponding receiver STAs in the network. The five Compatibility Bits field 43 distinguish the temporary, virtual address, from any existing MAC addresses present in the BSS for the wireless network. As noted, the AP station assigns an AID in an association response frame that establishes a current association of a receiver STA with the AP station. As such, the AP station has knowledge of all actual MAC addresses in the BSS, and the AP station maintains an exhaustive list of five CB bits b1-b5 for all present MAC addresses in the BSS. Therefore, an unpresented 5-bit pattern can be easily found and used as CB for indicating a compressed RA field to receiver STAs. Since the total pattern number is $2^5=32$, the five CB bits are selected from the first 3 octets of an Organizationally Unique Identifier (OUI), wherein the network interface controllers (NICs) in the BSS are rarely from 32 or more unique manufacturers. Bit b1 of Octet 0 (the U/L add bit) is always set to "0" for most commercial products, wherein setting the bit b1 to "1" differentiates the compressed RA address 41 from most of the NICs in the BSS. In this case the bit b1 is set to indicate a locally assigned address, which has no harmful effect within a BSS.

To determine the CBs, an AP station maintains a list of all 32 patterns of the 5-bit CB field 43 before any receiver STA joins the BSS. The AP station removes its own 5-bit CB pattern from the list. Whenever a receiver STA associates with the AP, the 5-bit CB pattern of the joining receiver STA is removed. Whenever a receiver STA disassociates with the AP, the 5-bit CB pattern of the departing receiver STA is added back to the list if no other STAs are sharing the same CB pattern. At any moment, there is a list of 5-bit CB patterns that can be selected from and placed in the compressed RA 41 to distinguish it from present (actual) 48-bit MAC address.

Distinguishing a receiver STA requires only 11 bits. Addressing up to 4 receiver STAs requires 4×11=44 bits. In one implementation, if supporting 4 receiver STAs is required and use of AID is desired, then four AIDs 42 may be included in one compressed RA field 41. In this case, other mechanisms are used to differentiate the virtual address from actual MAC addresses, including shuffling the order of the 4 AIDs to compose a unique MAC address for a receiver station. In another implementation of the invention, the AID can be reduced to 10 bits, wherein only 1024 ($2^{10}$) STAs can be uniquely identified. In this case, the remaining 7 bits (48-bit IEEE address minus one I/G Address Bit, minus 4 10-bit AIDs) can be used as compatibility bits. The number of addressable STAs is reduced by about half (50%) but the number is still large enough for a single BSS in the foreseeable future.

An alternative implementation is to use 11 bits for AIDs for only three receiver STAs and expend the Compatibility Bits to up to 14 bits to increase non-overlapping chance. However, this increases the storage requirement for the list of available patterns. A balanced approach is to use 8 bits to form a list of 8-bit entries for Compatibility Bits, to use 11 bits for AIDs, and leave the rest of the bits (6 bits) as reserved bits.

In case an actual MAC address is interpreted as a compressed address where the actual MAC address happens to match one or more of the AIDs of receiver STAs, then a receiver STA with its actual MAC address matching the content of the compressed RA field considers itself the destination of the RTS frame and hence replies with a CTS frame immediately. In one example, a receiver STA with IEEE 802.11ac capability (i.e., IEEE 802.11ac-capable) may find that its actual MAC address does not match the content of the compressed RA field, but proceeds further to check whether an RA field is a compressed RA field, according to an embodiment of the invention.

As such, an IEEE 802.11 ac-capable receiver STA checks the RA field twice, according to an embodiment of the invention. At the first check, it determines whether the RA value matches its regular MAC address. If it matches, the STA is the intended receiver. This case is a single-user transmission, wherein the RA field contains only one receiver address. If it does not match, then the STA initiates a second check since the RA field may be a compressed RA field, as described further below. In that case, the corresponding bits of the actual MAC address in the RA field match the AID of the receiver STA. The receiver STA, although not the intended (target) receiver of the RTS frame, will also reply to a CTS frame at the time determined by the position of the AID in the RA field. The CTS frame may collide with the CTS frame from the intended STA or may collide with the data transmission following the RTS/CTS exchange.

Figure 7:
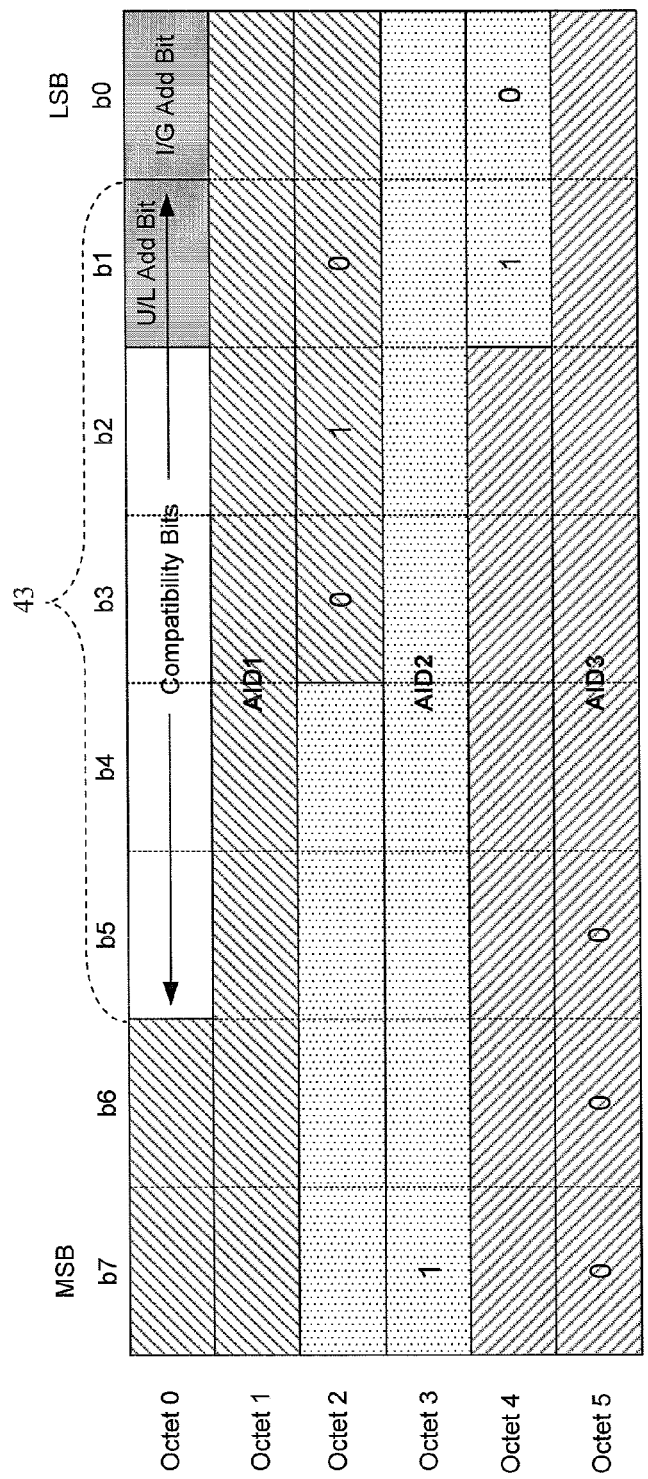
FIG. 7 shows a field structure of a compressed RA field including multiple AID fields with example bit patterns, according to an embodiment of the invention.

To avoid an actual MAC address being interpreted as a compressed address, the AP station analyzes the MAC address of a STA when that STA associates with the AP station. When the AP station assigns AIDs to associating STAs, assuming 14-bit AIDs are used (as illustrated in FIG. 7), the AP station checks the positions of the MAC address corresponding to the three MSBs of each AID. These positions include the following bits:

b1-b3 of Octet 2 (for AID1),
b7 of Octet 3 and b0-b1 of Octet 4 (for AID2),
b5-b7 of Octet 5 (for AID3).

If any of the above bits are non-zero, the corresponding AIDs do not pose issues (i.e., such AIDs will not be mistakenly treated as AIDs of a compressed RA field by a receiver STA).

If all three MSBs of an AID position are zeros, the AID is treated specially (i.e., assigned to the receiver STA as its own AID). In case the AID has been assigned to another STA previously, the AP station may need to disassociate the previous STA and re-associate it with another AID. The released AID will then be assigned to the receiver STA.

If more than a set of three-MSB positions have the "000" pattern, one AID is assigned as the AID of the receiver STA. Others AIDs are not assigned to any receiver STAs.

In the example shown in FIG. 7, positions of AID1 and AID2 are issue-free because at least one of the three MSB bits of actual AIDs is not zero so they will not match AID1 or AID2. The position of AID3 may possibly fall in the range of 1-2007, wherein bit b2 of Octet 4 to b4 of Octet 5 will be assigned as the AID of the receiver. Therefore, when the MAC address is parsed as a compressed RA, it could match an AID of the receiver STAs.

When a RTS with an actual MAC address in the RA field is received at an intended receiver STA, the STA processes it as an actual MAC address and replies with a CTS, and does not proceed further to analyze the RA field address. Other receiver STAs implementing IEEE 802.11 ac may attempt to analyze the RA field of the received RTS as a compressed RA. First such a receiver STA checks if all the following 9 bits are zeros:

b1-b3 of Octet 2 (for AID1),
b7 of Octet 3 and b0-b1 of Octet 4 (for AID2),
b5-b7 of Octet 5 (for AID3).

Only when all the above 9 bits are zeros, the RA field may be a compressed RA. The STA receivers will then compare their own 14-bit AIDs with three AID positions of the compressed RA field, finding their AIDs not present in the compressed RA field because the AID in the compressed RA field has been assigned to the intended receiver STA. Therefore, an actual MAC address will not be misinterpreted as a compressed RA field. If any of the 9 bits are none zeros, the RA field is not a compressed RA and there is no need for further processing at the receiver STA.

AP Operation in Using AIDs in a Compressed RA Field

An example operation scenario for an AP station using AIDs in a compressed RA field of a MU-RTs frame for enhanced RTS/CTS exchange according to an embodiment of the invention is now described. The AP station determines up to 3 targeted (intended) receiver STAs, and obtains AIDs of the receiver STAs. The AP station then obtains a 5-bit pattern as Compatibility Bits from a list it maintains. The AP station composes the compressed RA field for a MU-RTS frame 41 (FIG. 4), and records the order of the AIDs of the receiver STAs presented in the compressed the RA field (responsive CTSs from the receiver STAs are expected to be received at the AP station in this order).

The AP station composes the MU-RTS frame 41 as typical except that the AP station replaces the typical (regular) RA field with the compressed RA field (FIG. 4), and sets the value of the Duration field needed to cover transmission of the longest data frame from the AP station and multiple immediate responses from the receiver STAs.

The AP station then transmits the MU-RTS frame 41 on the wireless channel in broadcast mode. The timers for the expected CTSs from the multiple receiver STAs are set to reflect the number of CTSs expected and the interframe spacings between multiple CTSs.

In response to the MU-RTS, the AP station receives a CTS from each receiver STA. If all expected CTSs are received at the AP, the enhanced RTS/CTS exchange according to the invention is done successfully. The AP station can start transmitting data frames. If one or more expected CTSs in response to the MU-RTS do not arrive at the AP station, the AP station may either send another MU-RTS with a revised Duration value, or during a MU-TXOP begin transmitting data frames to the receiver STAs that have replied with CTSs. After data frame transmission, the AP station releases the remainder of the MU-TXOP.

Receiving STA Operation in Using AIDs in a Compressed RA Field

An example operation scenario for a receiver STA in enhanced RTS/CTS exchange using AIDs in a compressed RA field of a MU-RTS frame, according to an embodiment of the invention is now described. For a legacy wireless receiver STA (i.e., a receiver STA which does not operate according to IEEE 802.11ac protocol), when the legacy STA receives a MU-RTS 41 from the AP station, the legacy STA checks the compressed RA field 41 of the MU-RTS 40 and finds the address in the compressed RA field 41 field does not match the MAC address of the legacy STA. As such, the legacy STA determines that it is not the intended (target) receiver for the frame. The legacy STA updates its NAV using a value indicated in the Duration field of the MU-RTS 41, wherein the legacy STA does not transmit until the NAV counts down to zero.

For a non-legacy receiver STA which operates according to the IEEE 802.11ac protocol, when the non-legacy STA receives a MU-RTS 41 from the AP station, the non-legacy STA checks the RA field therein and finds that the address in the compressed RA field does not match the MAC address of the non-legacy STA. The non-legacy STA then checks whether the RA field is a compressed RA field by parsing the RA field using the compressed RA field format in FIG. 6.

If the non-legacy STA determines that the RA field is a compressed RA field, and if the non-legacy STA is one of the intended receivers STAs, the non-legacy determines its order in the compressed RA field. If the non-legacy STA is the first receiver, then it calculates the correct Duration value and replies with a regular CTS immediately after Point Coordination Function Interframe Space (PIFS in IEEE 802.11 standards) or Short Interframe Space (SIFS in IEEE 802.11 standards) from the end of the reception of the MU-RTS. If the non-legacy STA is not the first receiver, then it calculates the correct hold off duration value and replies with a regular CTS after Toffset=SIFS+(n−1)×(CTS+2×RIFS), where integer n is the order of the non-legacy STA in the compressed RA field of the MU-RTS ($1 \leq n \leq 3$). For example, if the non-legacy STA is a third receiver in order, then Toffset=SIFS+2×(CTS+2×RIFS).

Figure 8:
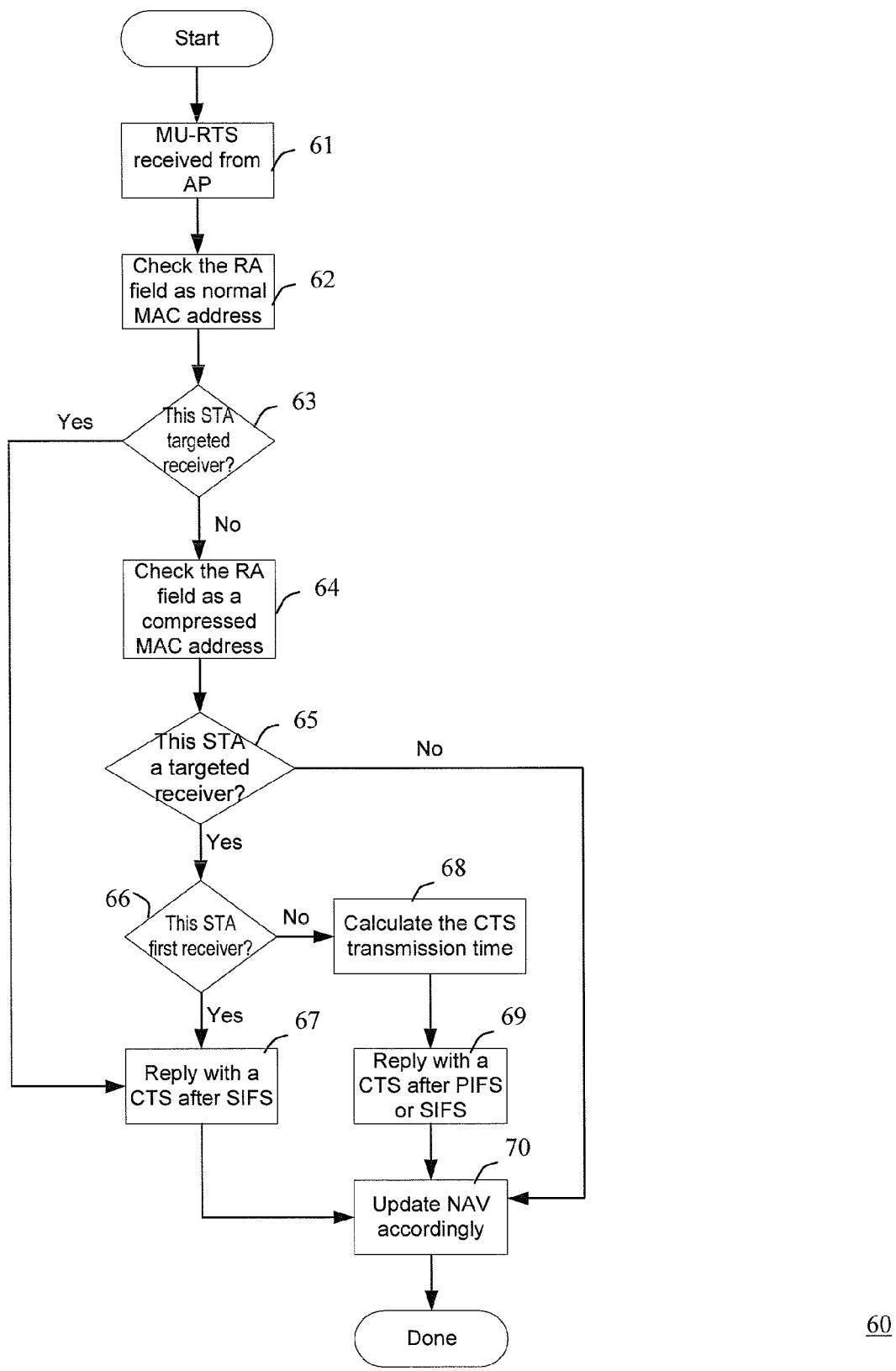
FIG. 8 shows a flowchart of a receiving station operation process, according to an embodiment of the invention.

However, if the non-legacy STA is not one of the intended receivers indicated in the compressed RA field, the non-legacy STA updates its NAV using the value indicated in the MU-RTS Duration field. FIG. 8 shows a flowchart of the process 60 for a receiving STA operation described above, according to an embodiment of the invention, including the following process blocks:

Block 61: MU-RTS 41 received from AP.
Block 62: Check the RA field as actual (real or normal) MAC address.
Block 63: This STA is a targeted receiver? If yes, proceed to block 67, else proceed to block 64.
Block 64: Check the RA field as a compressed MAC address (compressed RA field).
Block 65: This STA is a targeted receiver based on compressed address information in the compressed RA field? If yes, proceed to block 66, otherwise proceed to block 70.
Block 66: This STA is a first receiver in address order in the compressed RA field? If yes, proceed to block 67, otherwise proceed to block 68.
Block 67: Reply with a CTS after a SIFS period. Proceed to block 70.
Block 68: Calculate the CTS transmission time for hold off duration value. Specifically, the STA calculates the correct hold off duration value and replies with a regular CTS after Toffset=SIFS+(n−1)×(CTS+2×RIFS), where integer n is the order of the non-legacy STA in the compressed RA field of the MU-RTS ($1 \leq n \leq 3$). For example, if the non-legacy STA is a third receiver in order, then Toffset=SIFS+2×(CTS+2×RIFS).
Block 69: Reply with a CTS after PIFS or SIFS.
Block 70: Update NAV accordingly. End.

Using the enhanced RTS/CTS exchange according to an embodiment of the invention, the AP station may address up to 3 or 4 receiver STAs, depending on the number of bits that can be used for each AID. To address more receiver STAs (e.g., up to 4) using a compressed RA field, using a Unique Octet in the MAC address is used, according to an embodiment of the invention, as described below.

Using Unique Octet as MAC Address in Compressed RA Field

According to another embodiment of the invention for enhanced RTS/CTS exchange, the compressed RA field comprises a Unique Octet of each receiver station MAC address to represent a full IEEE-48 MAC address.

Figure 10:
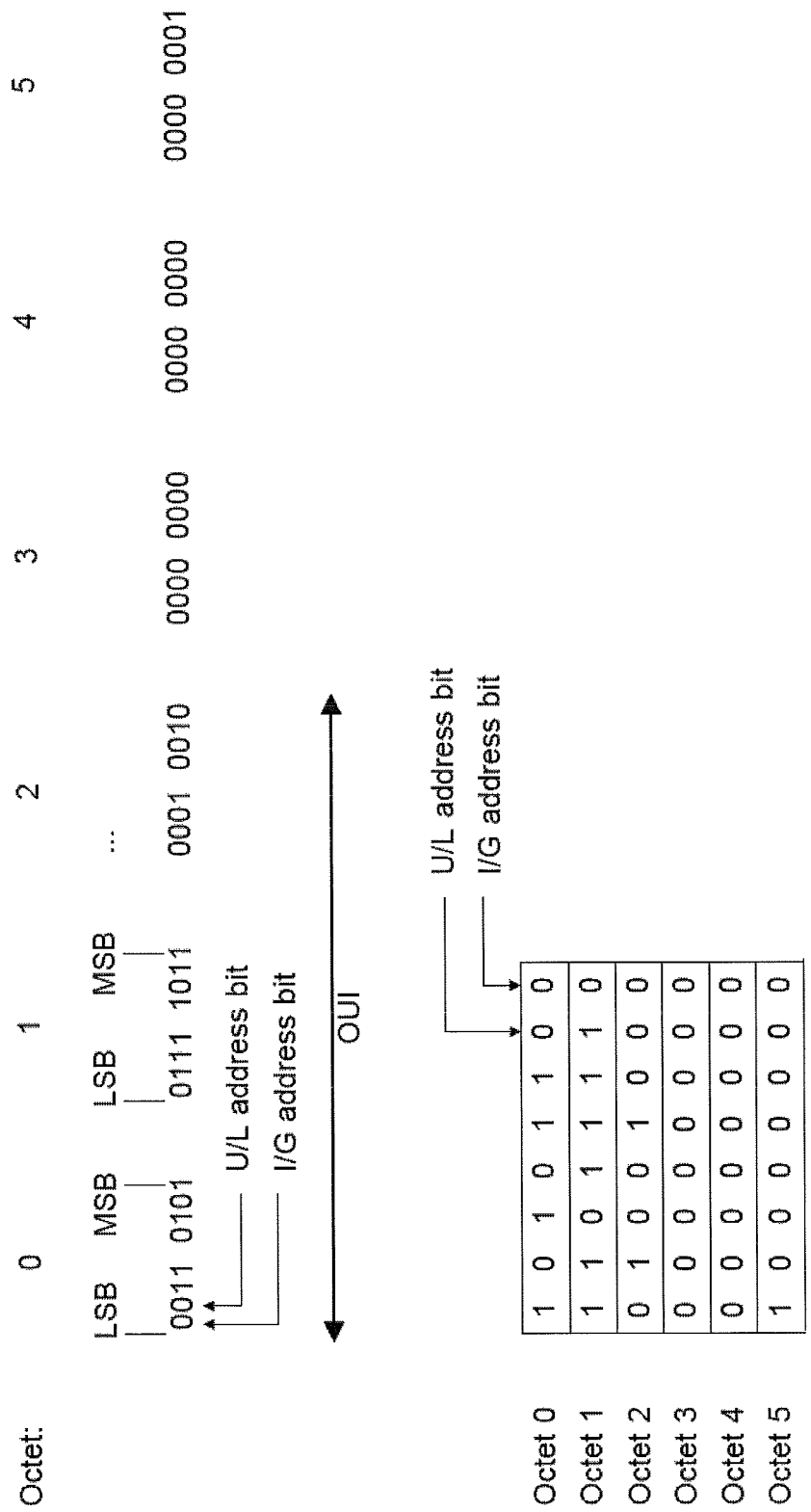
FIG. 10 shows an IEEE MAC-48 address structure.

In one implementation, one of the 6 octets in a 48-bit MAC address is used to uniquely represent a receiver STA. In this case, up to 4 receiver STAs can be addressed in the RA field 41. FIG. 10 shows an IEEE MAC-48 address structure according to IEEE Std. 802-2001 (R2007), IEEE Standard for Local and Metropolitan Area Networks: Overview and Architecture, 2007.

Figure 11:
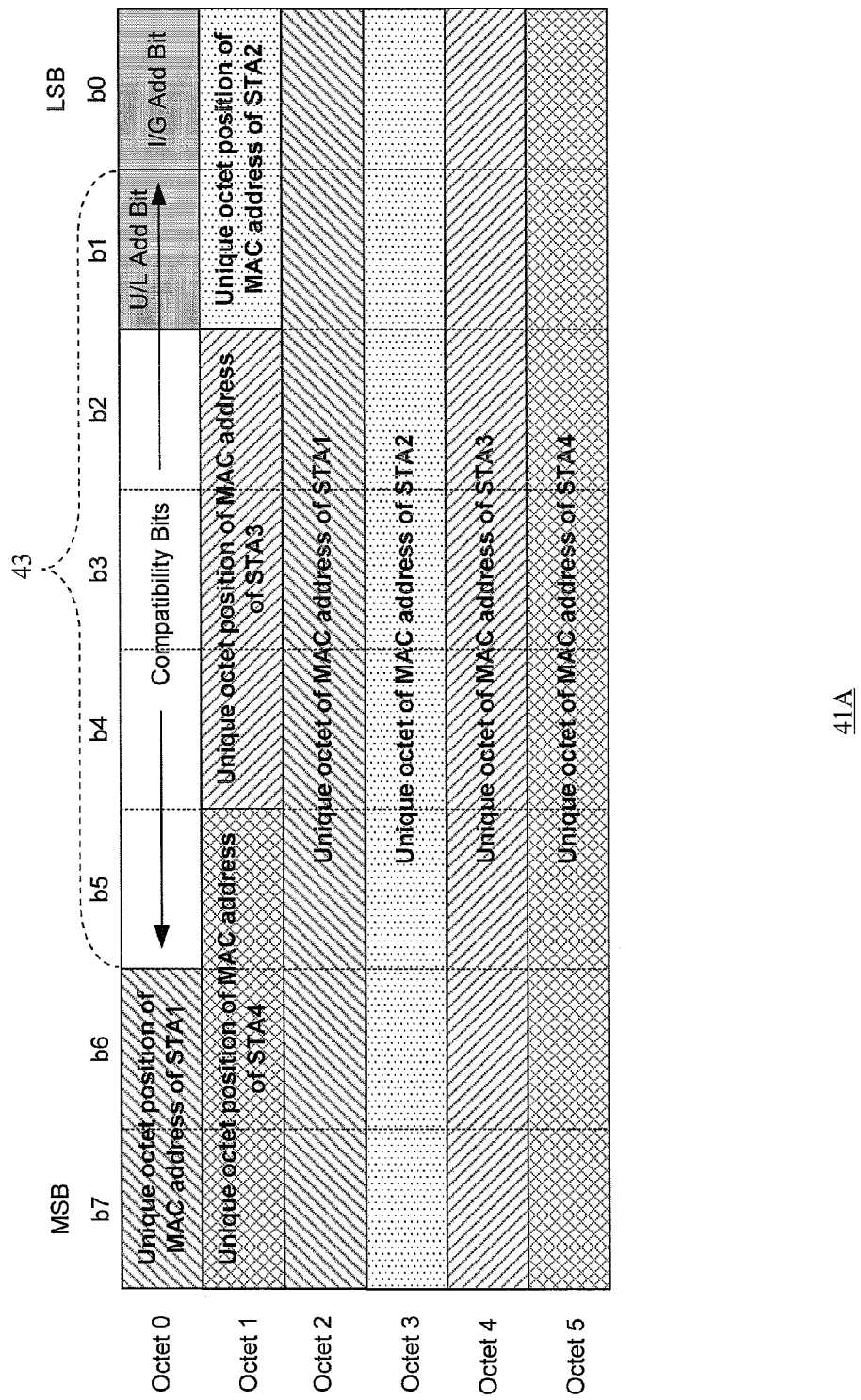
FIG. 11 shows a frame structure of a compressed RA field including Unique Octets representing different wireless receiver stations in a MU-RTS frame providing enhanced RTS/CTS channel reservation in a MU-MIMO wireless network environment, according to an embodiment of the invention.

FIG. 11 illustrates a compressed RA field 41A including Unique Octets, in an MU-RTS frame for enhanced RTS/CTS exchange, according to an embodiment of the invention. The compressed RA field 41A includes Unique Octets as compressed addresses for 4 receiver STAs (i.e., STA1-STA4, as indicated by different stippling). Specifically, bit b0 of Octet 0 indicates whether RA field 41A is an individual address or a group address. Bits b1-b5 of Octet 1 are Compatibility Bits 43, ensuring the temporary address (i.e., compressed address) does not equal to any actual (real) hardware MAC addresses in the network. The RA field 41A holds at most 4 unique octets of 4 receiver STAs. Each 48-bit MAC address contains 6 octets. Among the 6 octets, the chance that one of the octets of a receiver STA (e.g., Octet 5) is different from the same octet (e.g., Octet 5) of all other receiver STAs is sufficiently high (depending on the number of receiver STAs in the BSS). This is called a Unique Octet. In the RA field 41A, there are two 2-bit position indicators and two 3-bit position indicators after the Compatibility Bits. These indicate the octet number (Octet 0 to Octet 5) of each Unique Octet that will be used to identify a receiver STA. The Octet contents are stored from Octet 2 to Octet 5 of the compressed RA field 41A.

Figure 12:
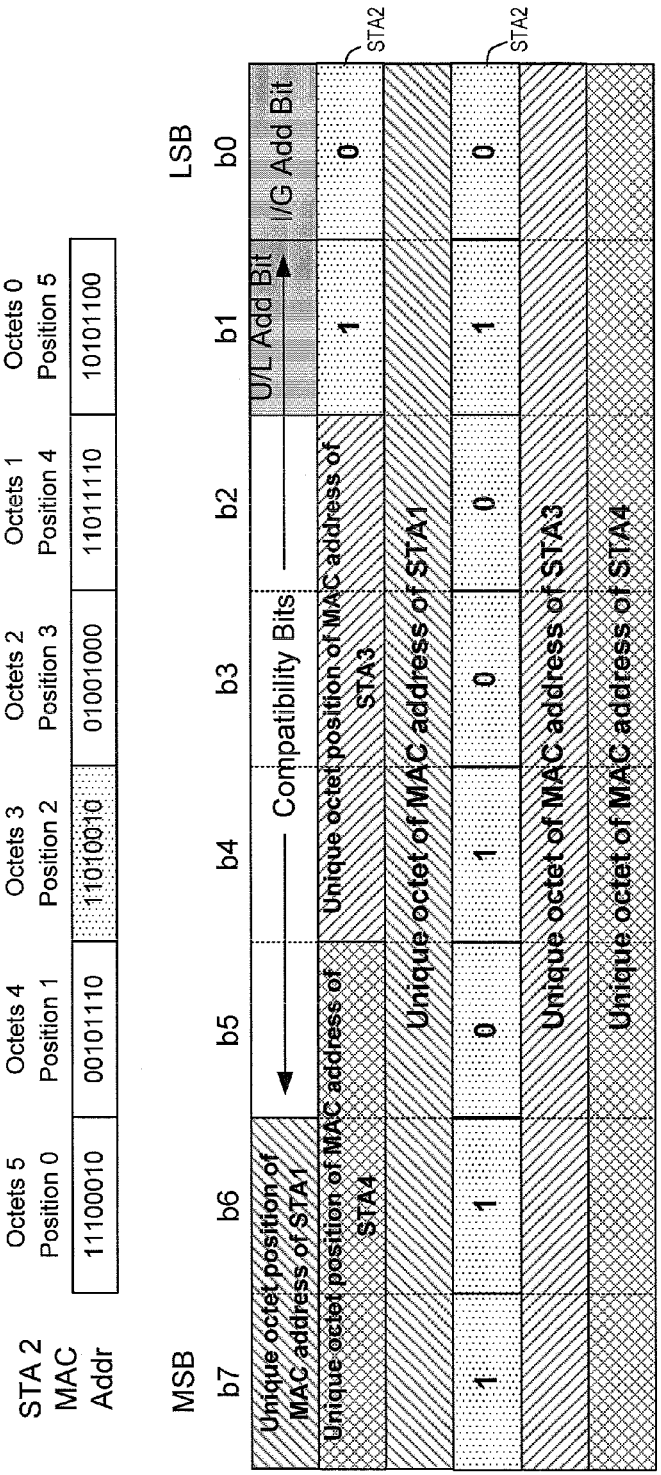
FIG. 12 shows an example compressed RA field including Unique Octets representing different wireless receiver stations, according to an embodiment of the invention.

FIG. 12 shows an example of using Unique Octets as MAC Addresses in the compressed RA field 41A corresponding to FIG. 11, according to an embodiment of the invention. In this example RA field 41A shown in FIG. 12, it is assumed Octet 3 of receiver STA2 is unique among all MAC addresses (different from Octet 3 of all other receiver stations in the network). Therefore, Octet 3 is selected to distinguish receiver STA2 from the rest of the receiver stations. This selection is indicated to the receiver stations, wherein the position of the unique Octet 2 (Position number=5−Octet number) is carried by bits b1 and b0 of Octet 1 of the compressed address field 41A. When the receiver stations receive an MU-RTS including such a compressed RA field 41A, each receiver STA compares its Octet 3 with the Octet 3 of the received field 41A, wherein a match indicates that the receiver STA is the destination of the MU-RTS.

In one implementation, in case the compatibility bits mechanism fails, the AP station cannot find any 5-bit pattern that is different from all present 5-bit patterns in the BSS. One solution involves composing a unique compressed RA field by selecting a 5-bit pattern, and shuffling the order of different AIDs or unique octets of the targeted receiver STAs. Because such failure only occurs when the receiver STA numbers are large and all 5-bit patterns have been presented in the network, essentially by selecting a proper 5-bit pattern and order of AIDs and unique octets, a unique compressed RA can be structured to be different from any existing actual MAC address.

AP Operation in using Unique Octet as MAC Address in Compressed RA Field

An example operation scenario for an AP station using Unique Octets in a compressed RA field 41A of an MU-RTS frame for enhanced RTS/CTS exchange according to an embodiment of the invention is now described. The AP station selects up to 4 intended (target) receiver STAs, and determines Unique Octets for each of the receiver STAs and records the position of each unique octet for the compressed RA field 41A. The AP station obtains a 5-bit pattern as Compatibility Bits from a list it maintains. The AP station composes the compressed RA field 41A, wherein for each selected receiver STA, the AP station places the unique octet position value in the corresponding 2- or 3-bit position field and places the content of the unique octet in its corresponding field in the RA field 41A (FIG. 11). The AP station records the order of each selected receiver STA presented in the compressed the RA field 41 (responsive CTSs for the MU-RTS are expected to arrive from the receiver STAs at the AP station in this order).

The AP station composes the MU-RTS frame 40 as typical, except the regular RA field is replaced with the compressed RA field 41A. The value of the Duration field indicates the length of the TXOP. The AP station then transmits the composed MU-RTS frame to the receiver STA in broadcast mode.

Timers for expected CTSs are set to reflect the number of CTSs expected and the inter-frame spacings between multiple CTSs. The AP stations holds off data transmission until the time expected to receive all CTSs has passed.

Upon receiving CTSs from individual receiver STAs at the AP station, if all expected CTSs are received, the enhanced RTS/CTS exchange is completed successfully and the AP station can start transmitting data frames in a MU-TXOP.

Figure 9:
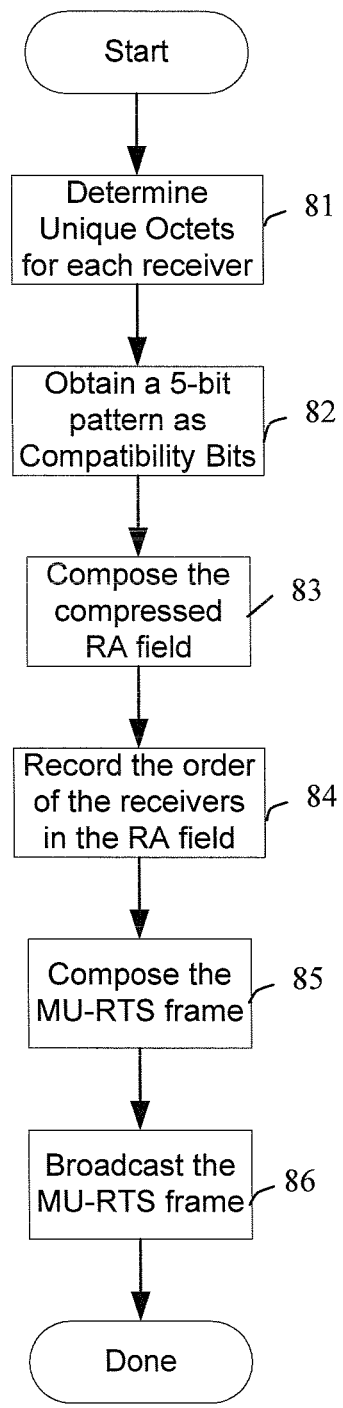
FIG. 9 shows a flowchart of an access point operation process, according to an embodiment of the invention.

If one or more expected CTSs are not received at the AP station, the AP station may send another MU-RTS frame with revised Duration value, or may start transmitting data to the receiver STAs that have replied with CTSs. After such data transmission, the AP stations releases any remainder of the MU-TXOP. FIG. 9 shows a flowchart of the process 80 for a receiving AP operation described above, according to an embodiment of the invention, including the following process blocks:

Block 81: Determine Unique Octets for each receiver.
Block 82: Obtain a 5-bit pattern as Compatibility Bits.
Block 83: Compose the compressed RA field.
Block 84: Record the order of the receivers in the RA field.
Block 85: Compose the MU-RTS frame.
Block 86: Broadcast the MU-RTS frame.

Receiving STA Operation in Using Unique Octet as Mac Address in Compressed RA Field An example operation scenario for a receiver STA in enhanced RTS/CTS exchange using Unique Octets in a compressed RA field of an MU-RTS frame, according to an embodiment of the invention is now described. A legacy receiver STA operates in a similar manner as described further above, in response to a MU-RTS including a compressed RA field 41A (FIG. 11).

Each non-legacy receiver STA that receives an MU-RTS including a compressed RA field 41A (FIG. 11) from the AP station checks the RA field 41A and finds that the address therein does not match its own MAC address. The non-legacy receiver STA checks if the RA field 41A is a compressed RA field by parsing the RA field using the format of the RA field 41A as shown in FIG. 11.

Figure 13:
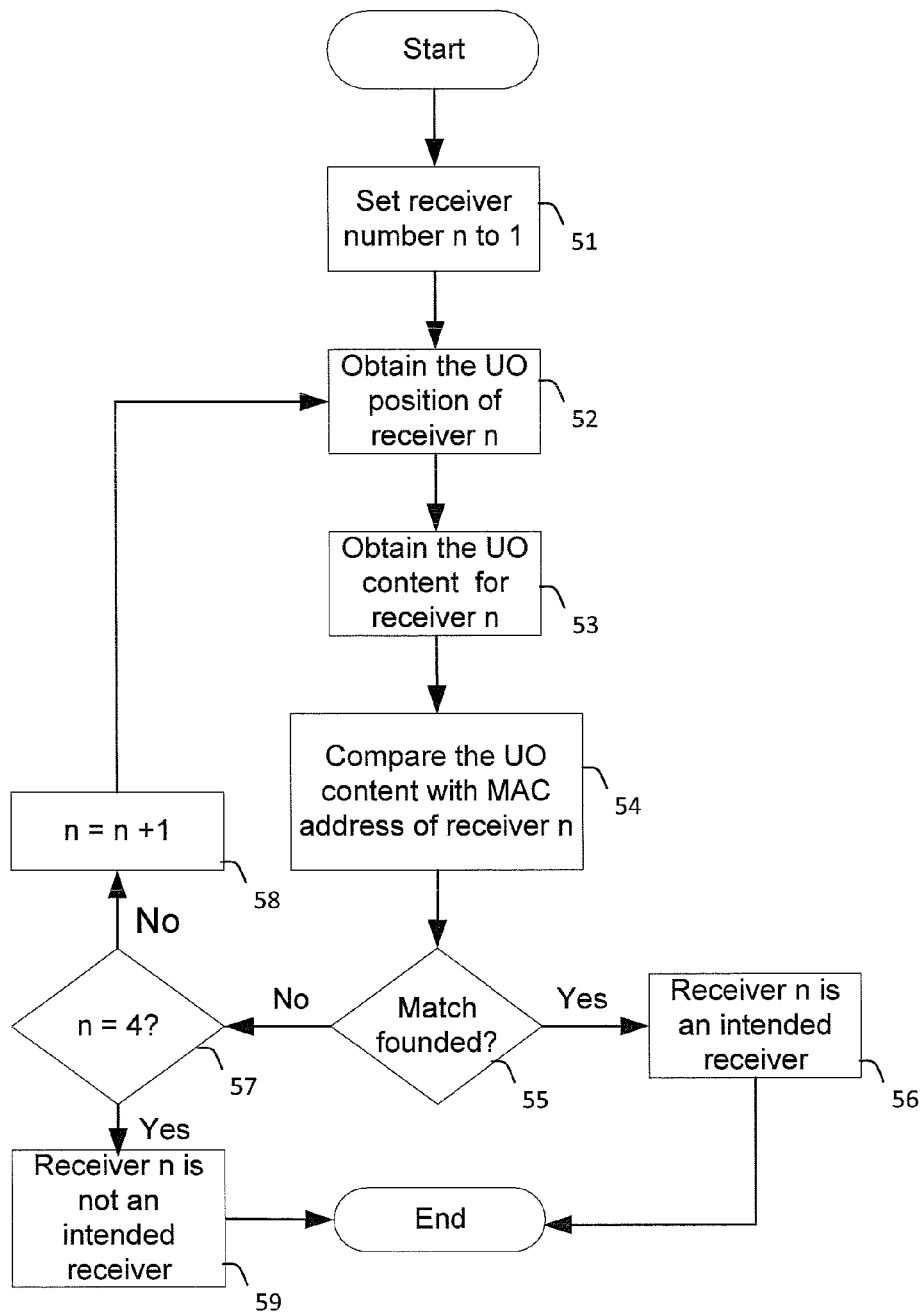
FIG. 13 shows a flowchart of a process for parsing the compressed RA field including multiple Unique Octets, according to an embodiment of the invention.

FIG. 13 shows a flowchart of an example process 50 for parsing the compressed RA field 41A including multiple unique octets, according to an embodiment of the invention, comprising:

Block 51: Initialize receiver STA n to 1.
Block 52: Obtain the Unique Octet (UO) position of receiver STA n.
Block 53: Obtain the UO content for receiver n from the corresponding position in the compressed RA field.
Block 54: Compare the obtained UO content with MAC address of the receiver n.
Block 55: Does the obtained UO content match the specified octet of MAC address of the receiver n? If yes, proceed to block 56, else proceed to block 57.
Block 56: Receiver n is an intended (target) receiver. End.
Block 57: Is number n equal to 4? If not, proceed to block 58, else proceed to block 59.
Block 58: Increment n and proceed to block 52.
Block 59: Receiver n is not an intended receiver. End.

If the receiving non-legacy receiver STA is one of the intended (target) receivers, the non-legacy receiver STA determine its order in the RA field 41A. If the non-legacy receiver STA is the first receiver, it calculates the correct hold off duration value and replies with a regular CTS immediately after PIFS or SIFS from the end of the reception of the MU-RTS. If the receiving non-legacy receiver STA is not the first receiver, it calculates the correct duration value and replies with a regular CTS after Toffset=SIFS+(n−1)×(CTS+2×RIFS), where integer n is the order of the receiver in the compressed RA field 41A of the MU-RTS (1≤n≤3). For example, for the third receiver, Toffset=SIFS+2×(CTS+2×RIFS).

If the receiving non-legacy receiver STA is not one of the intended receivers, the non-legacy STA updates its NAV using the value indicated in the Duration field of the MU-RTS.

Shortened Inter-Frame Spacing

As noted, another aspect of the enhanced RTS/CTS exchange mechanism according to an embodiment of the invention involves using a SIFS period to separate a response frame (i.e., CTS) from the frame (i.e., RTS) that solicited the response. In one implementation, the inter-frame spacing between MU-RTS and CTS1 must be SIFS, as shown by example channel reservation frame exchange timing diagram in FIG. 14 for a receiver STA. The length of SIFS is determined by:

PHY layer receiving (Rx) latency,
MAC layer processing delay,
PHY layer transmitting (Tx) latency.

Figure 14:
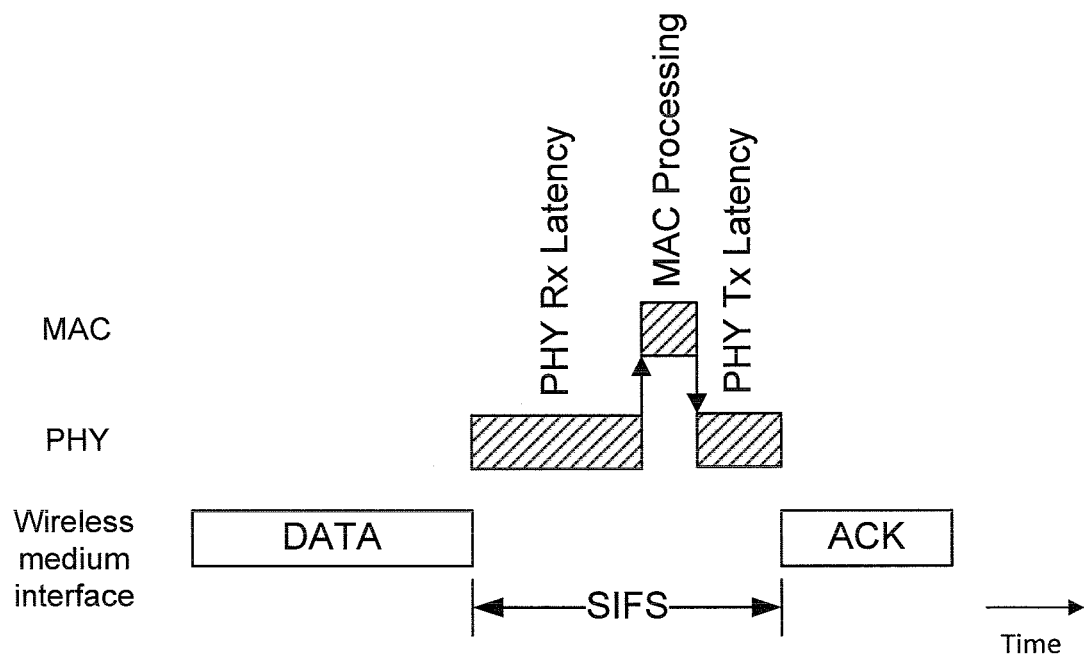
FIG. 14 shows a timing diagram of short inter-frame spacing (SIFS) between downlink (DL) and uplink (UL) transmissions, according to an embodiment of the invention.
Figure 15:
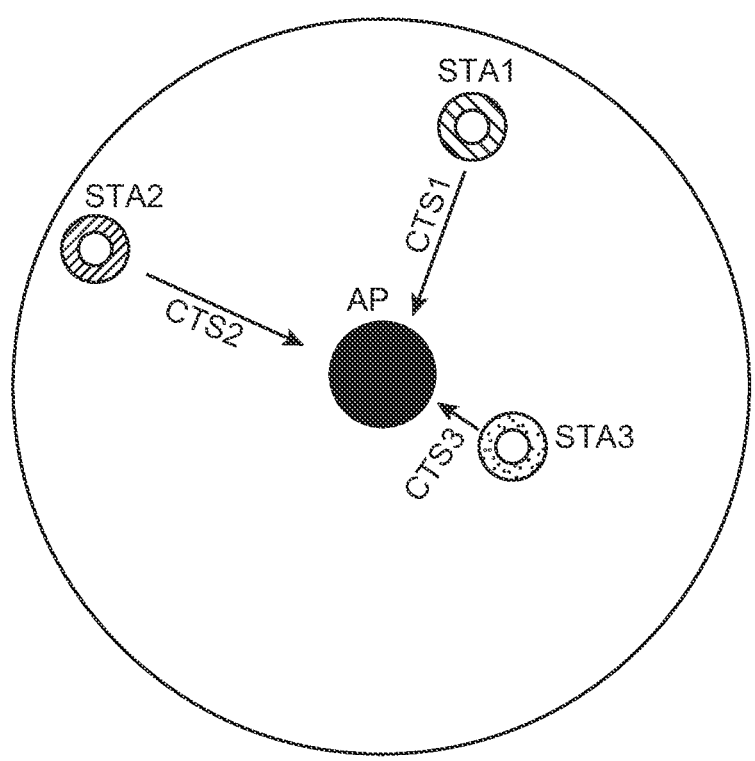
FIG. 15 shows a diagram of a wireless system implementing enhanced RTS/CTS channel reservation, illustrating different travel distances of different CTS frames, according to an embodiment of the invention.

Between CTSs, all processes during a SIFS can be performed before the receiver STAs are ready to transmit CTSs. Therefore, the inter-frame spacing between CTSs can be reduced to 2×RIFS (e.g., 2×2 µs=4 µs, FIG. 3), considering the propagation delay between stations (FIG. 14). For propagation delay, in the worst case, one receiver STA may be far away from the AP station and the next receiver STA following it is very close to the AP station. The propagation delay may need to be accounted for in order to avoid collisions between CTSs. For example, in the wireless network shown in FIG. 15, assuming STA2 is 1000 m away from the AP, the propagation delay is 3.3 µs, while STA3 is very close to the AP wherein the propagation delay for STA3 is essentially zero. In this example it is assumed that clock drift can be ignored since RTS/CTS exchange occurs during a very short time frame. As such, the inter-frame spacing is set to 2×RIFS between each pair of CTSs.

FIG. 3 further shows example transmission time offset values (i.e., Toffset) for transmission of different CTSs. Specifically, for the $n^{th}$ receiver STA, the CTS transmission offset time is defined as:

$$t_n = t_0 + SIFS \text{ for } n=1$$

$$t_n = t_0 + SIFS + (n-1)(CTS + 2 \times RIFS) \text{ for } n > 1$$

Toffset calculations are based on a reference, $t_0$, indicating a point in time when the last symbol of MU-RTS is received at a receiver STA. For example in FIG. 3, STAT must wait a turnaround time, SIFS, before it can transmit CTS1 to the AP station, wherein Toffset for CTS1 is $t_1 = t_0 + SIFS$. Further, STA2 must await a turnaround time of SIFS plus the CTS1 transmission time offset, and the CTS1 propagation delay, before STA2 can transmit CTS2 to the AP station, wherein $t_2 = t_0 + SIFS + CTS1 + 2 \times RIFS$. Similarly, for STA3, the value $t_3 = t_0 + SIFS + CTS1 + CTS2 + 2 \times (2 \times RIFS)$.

Time offsets $t_2$ and $t_3$ are calculated at $t_0$ by the receiver STA2 and STA3, respectively, as soon as the compressed RA field of the MU-RTS is decoded at those receiver STAs. Therefore, STA2 need not monitor the wireless communication medium (wireless channel) before it can transmit CTS2. Indeed, if STAT is at an opposite side of the AP station relative to STA2, then STA2 may not be able to detect CTS1 on the wireless medium even if STA2 monitors the wireless medium. The same applies to STA3. Further, all receiver STAs are turned around at $t_0$. Turn around means that the RF circuitry of the receiver switches from receiving state to transmitting state. As such, there is no turnaround again before the transmission of CTS2 and CTS3.

Referring back to the wireless network 10 in FIG. 1, the AP station (e.g., STA-A) further includes an enhanced RTS/CTS module 16A which implements the functions of the AP station for enhanced RTS/CTS for channel reservation described herein, according to embodiments of the invention. Further, each non-legacy wireless receiver STA (e.g., STA-B, STA-C, STA-D), includes an enhanced RTS/CTS module 16B which implements the functions of the non-legacy receiver STAs for enhanced RTS/CTS for channel reservation described herein, according to embodiments of the invention. FIG. 1 further shows a legacy station LSTA which operates under enhanced RTS/CTS, as described herein.

According to embodiments of the invention, a compressed RA field is to host multiple receiver MAC addresses in a MU-RTS for an enhanced RTS/CTS exchange mechanism which provides contention avoidance in MU-MIMO wireless communication. In one implementation, the compressed RA field comprises a group of AIDs, while in another implementation the compressed RA field comprises a group of Unique Octets of receiver station MAC addresses.

The MAC addresses in the compressed RA field are temporary receiver station addresses different from any actual (real) MAC address in the BSS. The temporary receiver station addresses are achieved using Compatibility Bits and shuffling of the order of representation of the receiver station addresses in the compressed RA field.

The compressed RA field is the same size as a typical RA field, but includes compressed addresses for multiple receiver stations, according to embodiments of the invention. As such, transmission of the compressed RA field does not require additional channel bandwidth compared to a conventional RA field such as in existing IEEE 802.11 standards. This provides backward compatibility with existing wireless local area networks.

In one implementation, the compressed RA field is utilized in a MU-RTS frame for IEEE 802.11 ac capable wireless stations. Shortened inter-frame spacing (shorter than SIFS) is used between consecutive CTSs from multiple receiver STAs in response to a MU-RTS from an AP station. The use of shortened inter-frame spacing improves throughput.

Embodiments of the invention are backward compatible with legacy stations, wherein the use of a compressed RA field in MU-RTS eliminates the need for a new type of frame format. Legacy STAs treat the MU-RTS as an RTS for other receiver STAs and can correctly update their NAVs.

Embodiments of the invention provide efficiency since the compressed RA field of a MU-RTS provides use of one MAC address field to holds up to 4 receiver station addresses, dramatically reducing the MU-RTS frame size. The AP station uses existing information to differentiate different receiver STAs, wherein both AID and MAC addresses are information known to the AP station (or are readily available for the AP station to obtain).

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters/receivers, in wireless networks, etc. Further, embodiments of the invention can take the form of an entirely hardware embodiment, an entirely software embodiment or an embodiment containing both hardware and software elements.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message frames, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of wireless communication in a wireless network, comprising:
reserving a transmission period for simultaneously transmitting data from a transmitting station to multiple intended receiving wireless stations on multiple downlink spatial streams over a wireless communication medium;
wherein reserving the transmission period comprises transmitting a request-to-send (RTS) frame to the multiple receiving wireless stations, the RTS frame including a receiver address (RA) field comprising a compressed RA field including compressed addresses for the multiple receiving wireless stations in the network,
wherein the transmitting station comprises a wireless access point (AP) station;
wherein each compressed address in the compressed RA field comprises an Association ID (AID) for each receiver wireless station assigned by the AP station; and
wherein the wireless AP station shuffling order of AIDs in the compressed RA field for the multiple receiver wireless stations for differentiating corresponding compressed addresses from actual addresses in the wireless network.

2. The method of claim 1 wherein:
the order of the AIDs in the compressed RA field indicates order of transmission of clear-to-send (CTS) frames from intended receiving wireless stations back to the wireless AP station over the wireless communication medium.

3. The method of claim 2, wherein:
the compressed RA field comprises six Octets capable of representing at least three AID values corresponding to at least three receiver wireless stations;
bit 0 of Octet 0 indicates whether the compressed RA field represents an individual receiver wireless station address or compressed addresses for multiple receiver wireless station addresses;
bits 1-5 of Octet 1 comprise Compatibility Bits (CB) configured to ensure that the compressed addresses do not equal any actual addresses in the wireless network; and
each AID comprises 14 bits, such an AID field is set to 0 if it is not used to indicate any receiver wireless station address, wherein the order of the AIDs presented in the compressed RA field indicates order of transmission of CTS frames from intended receiving wireless stations back to the AP wireless station over the wireless communication medium.

4. The method of claim 3, further comprising:
setting the three most significant bits (MSBs) of each 14-bit AID to zeros; and
a receiving wireless station utilizing the AID to differentiate a compressed RA field from an actual address in the wireless network.

5. The method of claim 3, further comprising:
shortening a 14-bit AID to an 11-bit AID by removing the three most significant bits (MSBs) of the 14-bit AID, allowing allocation of additional bits as compatibility bits up to 14 bits for a stronger bit pattern for a receiver wireless station to differentiate the compressed RA field from an actual RA field including an actual address in the wireless network.

6. The method of claim 3, further comprising:
shortening a 14-bit AID to a 10-bit AID by removing the four most significant bits (MSBs) of the 14-bit AID, allowing accommodation of four AIDs in a single compressed RA field.

7. The method of claim 2, wherein the AP wireless station shuffling the order of the AIDs in the compressed RA field comprises shuffling the order of the AIDs in the compressed RA field for four receiver wireless stations to differentiate the corresponding compressed addresses from actual addresses in the wireless network.

8. The method of claim 1, wherein:
each compressed address in the compressed RA field comprises a portion of actual address of a corresponding receiver wireless station, to uniquely represent that receiver wireless station.

9. The method of claim 8, wherein:
each compressed address in the compressed RA field comprises a Unique Octet of actual address of a corresponding receiver wireless station, to uniquely represent that receiver wireless station in the network.

10. The method of claim 8, wherein each Unique Octet comprises an 8-bit pattern that is unique in that specific position in the compressed RA field among all participating wireless stations in a Basic Service Set (BSS).

11. The method of claim 9, wherein the compressed RA field further comprises Compatibility Bits (CB) configured to ensure that the compressed addresses do not equal any actual addresses in the wireless network.

12. The method of claim 2, further comprising:
the AP wireless station specifying an inter-frame spacing period for responsive CTS frames from the receiver wireless stations to the AP wireless station in relation to the RTS frame.

13. The method of claim 12, wherein the inter-frame spacing period between said RTS frame and the first CTS frame which is of SIFS in length.

14. The method of claim 2, further comprising:
the AP wireless station specifying an inter-frame spacing period between multiple responsive CTS frames from the receiver wireless stations to the AP wireless station in relation to the RTS frame.

15. The method of claim 14, wherein the inter-frame spacing periods between multiple responsive CTS frames are set to twice reduced inter-frame spacing (RIFS), instead of short inter-frame spacing (SIFS), in order to reduce control overhead.

16. The method of claim 1, further comprising:
upon reserving a transmission period, simultaneously transmitting data from the transmitting station to multiple intended receiving wireless stations on multiple downlink spatial streams over the wireless communication medium.

17. The method of claim 1, wherein the transmitting station comprises a multiple-input-multiple-output (MIMO) wireless station.

18. The method of claim 1, wherein the wireless network comprises a wireless local area network (WLAN).

19. A wireless station for wireless communication in a wireless network, comprising:
a communication physical layer configured for wireless communication over a wireless communication module; and
a channel access module configured for reserving a transmission period for simultaneously transmitting data from the wireless station to multiple intended receiving wireless stations on multiple downlink spatial streams over a wireless communication medium, the channel access module further configured for utilizing the communication physical layer for transmitting a request-to-send (RTS) frame to the multiple receiving wireless stations, the RTS frame including a receiver address (RA) field comprising a compressed RA field including compressed addresses for the multiple receiving wireless stations in the wireless network;
wherein the wireless station comprises an access point (AP) wireless station; each compressed address in the compressed RA field comprises an Association ID (AID) for each receiver wireless station assigned by the AP wireless station, and
wherein the AP wireless station shuffling order of the AIDs in the compressed RA field for the multiple receiver wireless stations for differentiating corresponding compressed addresses from actual addresses in the wireless network.

20. The wireless station of claim 19, wherein:
the order of the AIDs in the compressed RA field indicates order of transmission of clear-to-send (CTS) frames from intended receiving wireless stations back to the AP station over the wireless communication medium.

21. The wireless station of claim 20, wherein:
the compressed RA field comprises six Octets capable of representing at least three AID values corresponding to at least three receiver wireless stations;
bit 0 of Octet 0 indicates whether the compressed RA field represents an individual receiver wireless station address or compressed addresses for multiple receiver wireless station addresses;
bits 1-5 of Octet 1 comprise Compatibility Bits (CB) configured to ensure that the compressed addresses do not equal any actual addresses in the wireless network; and each AID comprises 14 bits, such an AID field is set to 0 if it is not used to indicate any receiver wireless station address, wherein the order of the AIDs presented in the compressed RA field indicates order of transmission of CTS frames from intended receiving wireless stations back to the AP wireless station over the wireless communication medium.

22. The wireless station of claim 21, wherein:
the channel access module is further configured for setting the three most significant bits (MSBs) of each 14-bit AID to zeros for a receiver wireless station to differentiate a compressed RA field from an actual address in the wireless network.

23. The wireless station of claim 21, wherein:
the channel access module is further configured for shortening a 14-bit AID to an 11-bit AID by removing the three most significant bits (MSBs) of the 14-bit AID, allowing allocation of additional bits as compatibility bits up to 14 bits for a stronger bit pattern for a receiver wireless station to differentiate the compressed RA field from an actual RA field.

24. The wireless station of claim 21, wherein:
the channel access module is further configured for shortening a 14-bit AID to a 10-bit AID by removing the four most significant bits (MSBs) of the 14-bit AID, allowing accommodation of four AIDs in a single compressed RA field.

25. The wireless station of claim 20, wherein:
shuffling the order of the AIDs in the compressed RA field comprises shuffling the order of the AIDs in the compressed RA field for four receiver wireless stations to differentiate the corresponding compressed addresses from actual addresses in the wireless network.

26. The wireless station of claim 19, wherein:
each compressed address in the compressed RA field comprises a portion of actual address of a corresponding receiver wireless station, to uniquely represent that receiver wireless station.

27. The wireless station of claim 26, wherein:
each compressed address in the compressed RA field comprises a Unique Octet of actual address of a corresponding receiver wireless station, to uniquely represent that receiver wireless station in the wireless network.

28. The wireless station of claim 26, wherein each Unique Octet comprises an 8-bit pattern that is unique in that specific position in the compressed RA field among all participating wireless stations in a Basic Service Set (BSS).

29. The wireless station of claim 28, wherein the compressed RA field further comprises Compatibility Bits (CB) configured to ensure that the compressed addresses do not equal any actual addresses in the wireless network.

30. The wireless station of claim 20, wherein:
the channel access module is further configured for specifying an inter-frame spacing period for responsive CTS frames from the receiver wireless stations to the AP wireless station in relation to the RTS frame.

31. The wireless station of claim 30, wherein the inter-frame spacing period between said RTS frame and a CTS frame which is of short inter-frame spacing (SIFS) in length.

32. The wireless station of claim 20, wherein:
the channel access module is further configured for specifying an inter-frame spacing period between multiple responsive CTS frames from the receiver wireless stations to the AP wireless station in relation to the RTS frame.

33. The wireless station of claim 32, wherein the inter-frame spacing periods between multiple responsive clear-to-send frames are set to twice reduced inter-frame spacing (RIFS), instead of short inter-frame spacing (SIFS), in order to reduce control overhead.

34. The wireless station of claim 19, wherein:
the channel access module is further configured such that, upon reserving a transmission period, simultaneously transmitting data from the AP wireless station to multiple intended receiving wireless stations on multiple downlink spatial streams over the wireless communication medium.

35. The wireless station of claim 19, wherein the wireless station comprises a multiple-input-multiple-output (MIMO) wireless station.

36. The wireless station of claim 19, wherein the wireless network comprises a wireless local area network (WLAN).

37. A wireless station for communication in a wireless network, comprising:
a communication physical layer configured for wireless communication over a wireless communication module;
a channel access module configured for receiving a request-to-send (RTS) frame from an access point (AP) wireless station for reserving a transmission period for simultaneously transmitting data from the wireless station to multiple intended receiving wireless stations on multiple downlink spatial streams over a wireless communication medium in the wireless network, wherein the RTS frame includes a receiver address (RA) field; and
the channel access module is further configured for determining if the RA field comprises an actual address in the wireless network or the RA field comprises a compressed RA field including compressed addresses for the multiple receiving wireless stations in the wireless network;
wherein each compressed address in a compressed RA field comprises an Association ID (AID) for each receiver wireless station assigned by the AP wireless station, such that the order of the AIDs presented in the compressed RA field indicates order of transmission of clear-to-send (CTS) frames from intended receiving wireless stations back to the AP wireless station over the wireless communication medium,
wherein order of the AIDs in the compressed RA field are shuffled for the receiving wireless stations for differentiating corresponding compressed addresses from actual addresses in the wireless network.

38. The wireless station of claim 37, wherein:
the channel access module is further configured such that, upon detecting that the wireless station is a targeted wireless receiver based on an actual address in the RA field, the wireless station transmitting a CTS reply after a SIFS time period.

39. The wireless station of claim 37, wherein:
the channel access module is further configured such that, upon detecting that the RA field comprises a compressed RA field:
upon determining that the wireless station is a targeted wireless receiver based on a compressed address in the RA field, if the wireless station is a first wireless receiver in order based on the AIDs in compressed RA field, the wireless station transmitting a CTS reply after a SIFS period, otherwise the wireless station calculating a CTS transmission time for hold off and transmitting a CTS reply after a SIFS period or PIFS period.

40. A method of wireless communication in a wireless network, comprising:

reserving a transmission period for simultaneously transmitting data from a transmitting station to multiple intended receiving wireless stations on multiple downlink spatial streams over a wireless communication medium;

wherein reserving the transmission period comprises transmitting a request-to-send (RTS) frame to the multiple receiving wireless stations, the RTS frame including a receiver address (RA) field comprising a compressed RA field including compressed addresses for the multiple receiving wireless stations in the wireless network, wherein each compressed address in the compressed RA field comprises an Association ID (AID) for each receiver wireless station assigned by the transmitting station;

wherein order of the AIDs presented in the compressed RA field indicates order of transmission of clear-to-send (CTS) frames from intended receiving wireless stations back to the transmitting station over the wireless communication medium;

wherein inter-frame spacing periods between multiple responsive CTS frames are set to twice reduced inter-frame spacing (RIFS), instead of short inter-frame spacing (SIFS), for reducing control overhead; and wherein the order of the AIDs in the compressed RA field are arranged for the receiving wireless stations for differentiating corresponding compressed addresses from actual addresses in the wireless network.

41. A wireless station for wireless communication in a wireless network, comprising:

a communication physical layer configured for wireless communication over a wireless communication module; and a channel access module configured for reserving a transmission period for simultaneously transmitting data from the wireless station to multiple intended receiving wireless stations on multiple downlink spatial streams over a wireless communication medium, the channel access module further configured for utilizing the communication physical layer for transmitting a request-to-send (RTS) frame to the multiple receiving wireless stations, the RTS frame including a receiver address (RA) field comprising a compressed RA field including compressed addresses for the multiple receiving wireless stations in the wireless network;

wherein:
the wireless station comprises a wireless access point (AP) station; and each compressed address in the compressed RA field comprises an Association ID (AID) for each receiver wireless station assigned by the AP wireless station;

the channel access module is further configured for specifying an inter-frame spacing period between multiple responsive CTS frames from the receiver wireless stations to the AP wireless station in relation to the RTS frame;

the inter-frame spacing periods between multiple responsive clear-to-send frames are set to twice reduced inter-frame spacing (RIFS), instead of short inter-frame spacing (SIFS), for reducing control overhead; and order of the AIDs in the compressed RA field are arranged for the receiving wireless stations for differentiating corresponding compressed addresses from actual addresses in the wireless network.

42. The method of claim 2, wherein the compressed RA field comprises six Octets for representing at least three AID values corresponding to at least three receiver wireless stations.

43. The method of claim 42, wherein one bit of a first Octet indicates whether the compressed RA field represents an individual receiver station address or compressed addresses for multiple receiver wireless station addresses.

\* \* \* \* \*